(12) United States Patent
Tsunekawa

(10) Patent No.: US 12,056,402 B2
(45) Date of Patent: Aug. 6, 2024

(54) PRINT SYSTEM PERMITTING USAGE OF PRINT DEVICE CAPABILITIES USING A STANDARD PRINT PROTOCOL AND RECORDING MEDIUM

(71) Applicant: CANON KABUSHIKI KAISHA, Tokyo (JP)

(72) Inventor: Kiyohiro Tsunekawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/159,195

(22) Filed: Jan. 25, 2023

(65) Prior Publication Data

US 2023/0244418 A1 Aug. 3, 2023

(30) Foreign Application Priority Data

Jan. 28, 2022 (JP) .................................. 2022-012398

(51) Int. Cl.
*G06F 3/12* (2006.01)
(52) U.S. Cl.
CPC .......... *G06F 3/1204* (2013.01); *G06F 3/1232* (2013.01); *G06F 3/1238* (2013.01); *G06F 3/1257* (2013.01); *G06F 3/1287* (2013.01)
(58) Field of Classification Search
CPC .... G06F 3/1204; G06F 3/1232; G06F 3/1238; G06F 3/1257; G06F 3/1287; G06F 3/122; G06F 3/1222; G06F 3/1267; G06F 3/1285; G06F 3/1288; G06F 3/1205; Y02D 10/00
See application file for complete search history.

(56) References Cited

U.S. PATENT DOCUMENTS

| 6,119,079 A * | 9/2000 | Wang ...................... G06F 9/454 704/8 |
| 2013/0021646 A1* | 1/2013 | Ichikawa ........... G06K 15/1817 358/1.15 |
| 2018/0203649 A1* | 7/2018 | Ramakrishnan ......... H04N 1/00 |
| 2019/0303054 A1* | 10/2019 | Kaneda ................. G06F 3/1285 |
| 2020/0326894 A1* | 10/2020 | Sako ..................... G06F 3/1292 |

FOREIGN PATENT DOCUMENTS

JP 2019196018 A 11/2019

OTHER PUBLICATIONS

Kennedy et al. "IPP Enterprise Printing Extensions v2.0 (EPX)" The Printer Working Group. Apr. 23, 2021: pp. 1-67, https://ftp.pwg.org/pub/pwg/ipp/wd/wd-ipppx20-20210423.pdf. Cited in the specification.

* cited by examiner

*Primary Examiner* — Iriana Cruz
(74) *Attorney, Agent, or Firm* — ROSSI, KIMMS & McDOWELL LLP

(57) ABSTRACT

A printing system comprising a printing device and a client device that performs an output instruction of a print job to the printing device by a standard protocol, the printing device comprising: receiving a storage region in which a print job can be stored as a saved job and capability information showing that the storage of the saved job is possible depending on the capacity information request from the client device and accompanying support attribute information by using the standard protocol and associated support attribute information and the client device comprising: a print instruction control means that adds the attribute information corresponding to an instruction from a user as an attribute of the print job upon receipt of a capability response indicating that the storage of the saved job is possible.

14 Claims, 18 Drawing Sheets

```
(B) Capability response packet (the case of supporting secure print,
saved job, and authentication print)

Version : 2.0
Status-code : successful
Request-ID : 1

Operation-attributes-tag:
Printer-attributes-tag
610 ─  operations-supported : "create-job", "send-document", "cancel-job", "Get-
       Printer-attributes", "Get-Job-attributes", "print-job"
       color-supported : true
       copies-supported : 1 - 9999
       sides-supported : "one-sided", "two-sided-short-edge"
611 ─  job-storage-supported : "job-release-action", "job-storage-access"
612 ─  job-release-action-supported : "job-password", "owner-authorized",
       "button-release"
```

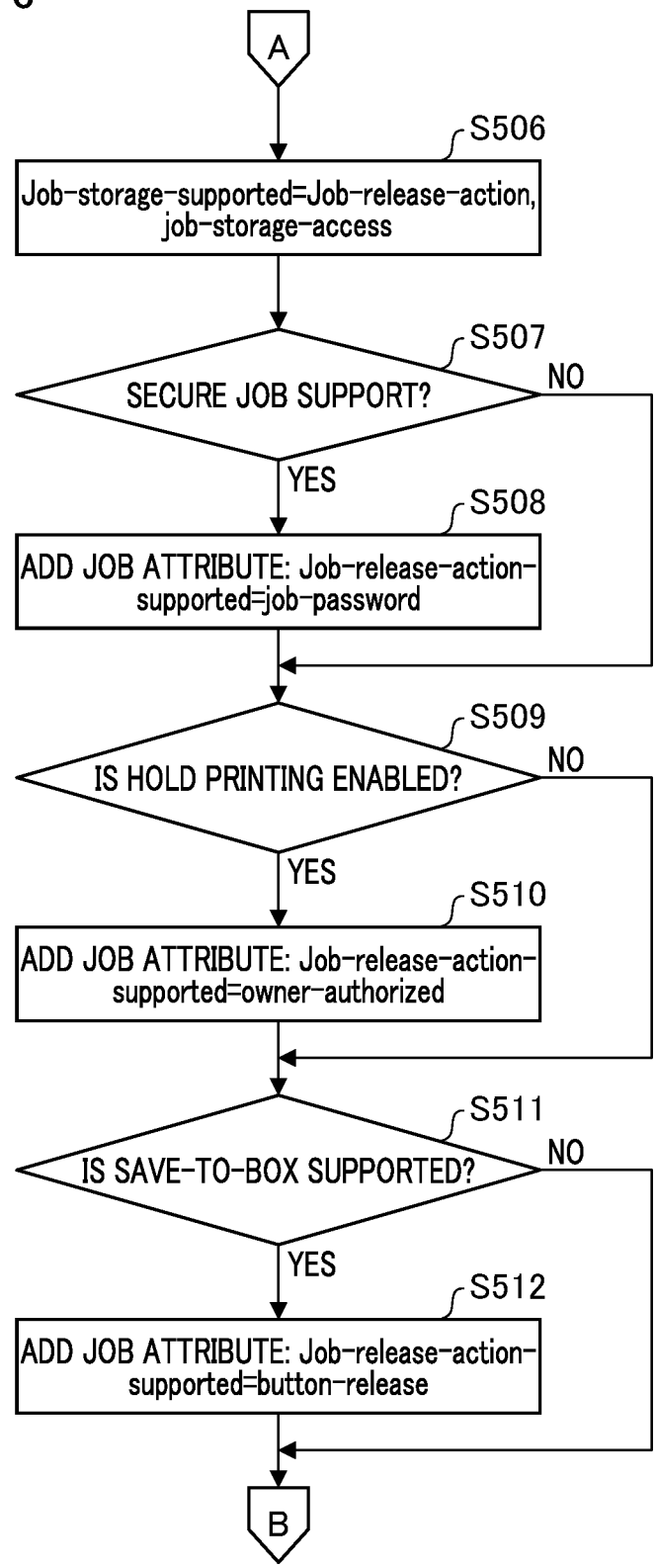

FIG. 7A (A) Capability query request packet

601 — Version : 2.0
Operation : Get-Printer-Attributes
Request-ID : 1

602 — Operation-attributes-tag :
Requested-attributes:
603 — operations-supported
color-supported
copies-supported
sides-supported
604 — job-storage-supported
605 — job-release-action-supported

FIG. 7B (B) Capability response packet (the case of supporting secure print, saved job, and authentication print)

Version : 2.0
Status-code : successful
Request-ID : 1

Operation-attributes-tag:
Printer-attributes-tag
610 — operations-supported : "create-job", "send-document", "cancel-job", "Get-Printer-attributes", "Get-Job-attributes", "print-job"
color-supported : true
copies-supported : 1 - 9999
sides-supported : "one-sided", "two-sided-short-edge"
611 — job-storage-supported : "job-release-action", "job-storage-access"
612 — job-release-action-supported : "job-password", "owner-authorized", "button-release"

FIG. 7C (C) Capability response packet (the case of supporting secure print)

Version : 2.0
Status-code : successful
Request-ID : 1

Operation-attributes-tag:
Printer-attributes-tag
610 — operations-supported : "create-job", "send-document", "cancel-job", "Get-Printer-attributes", "Get-Job-attributes", "print-job"
color-supported : true
copies-supported : 1 - 9999
sides-supported : "one-sided", "two-sided-short-edge"
611 — job-storage-supported : "job-release-action", "job-storage-access"
613 — job-release-action-supported : "job-password"

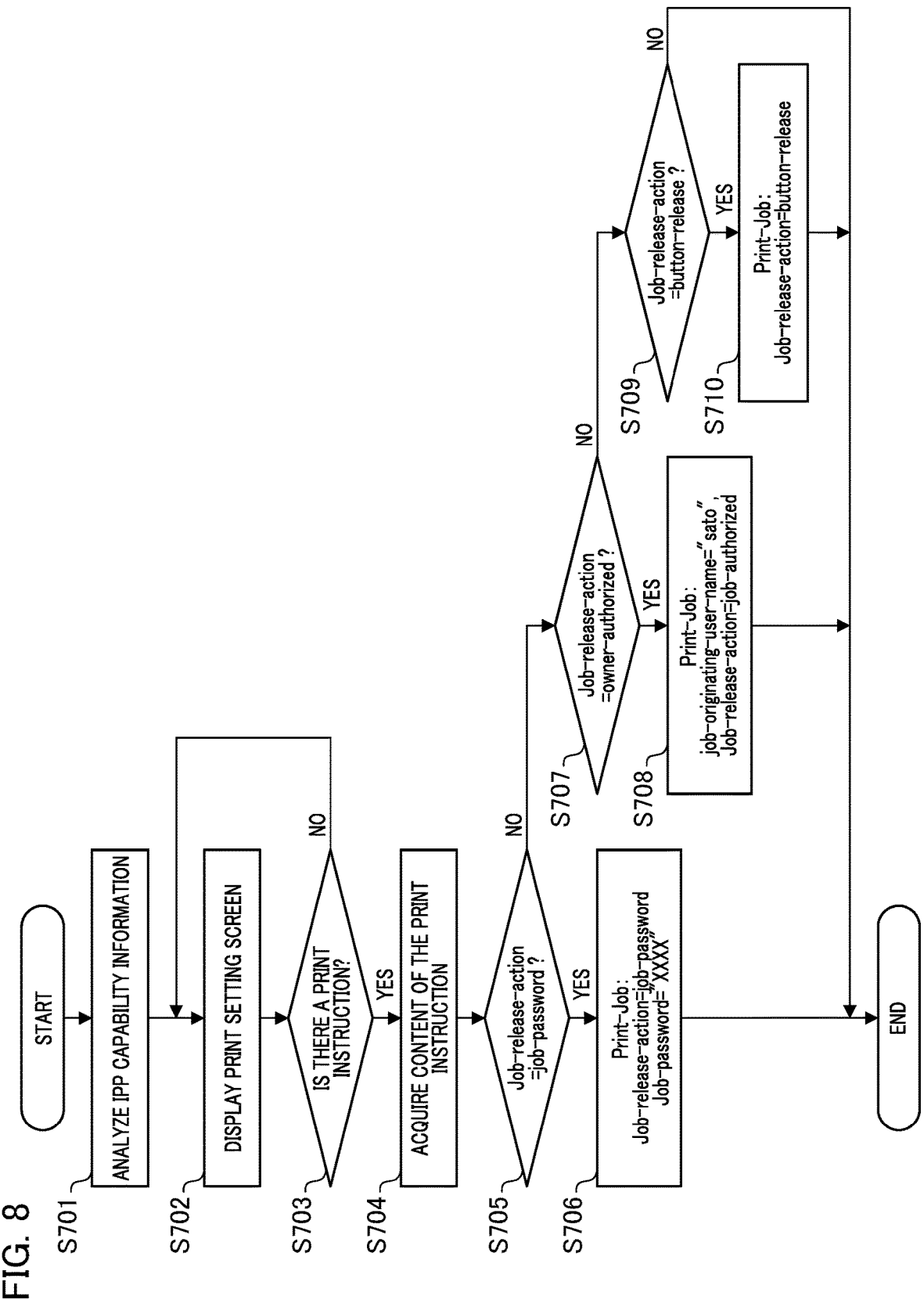

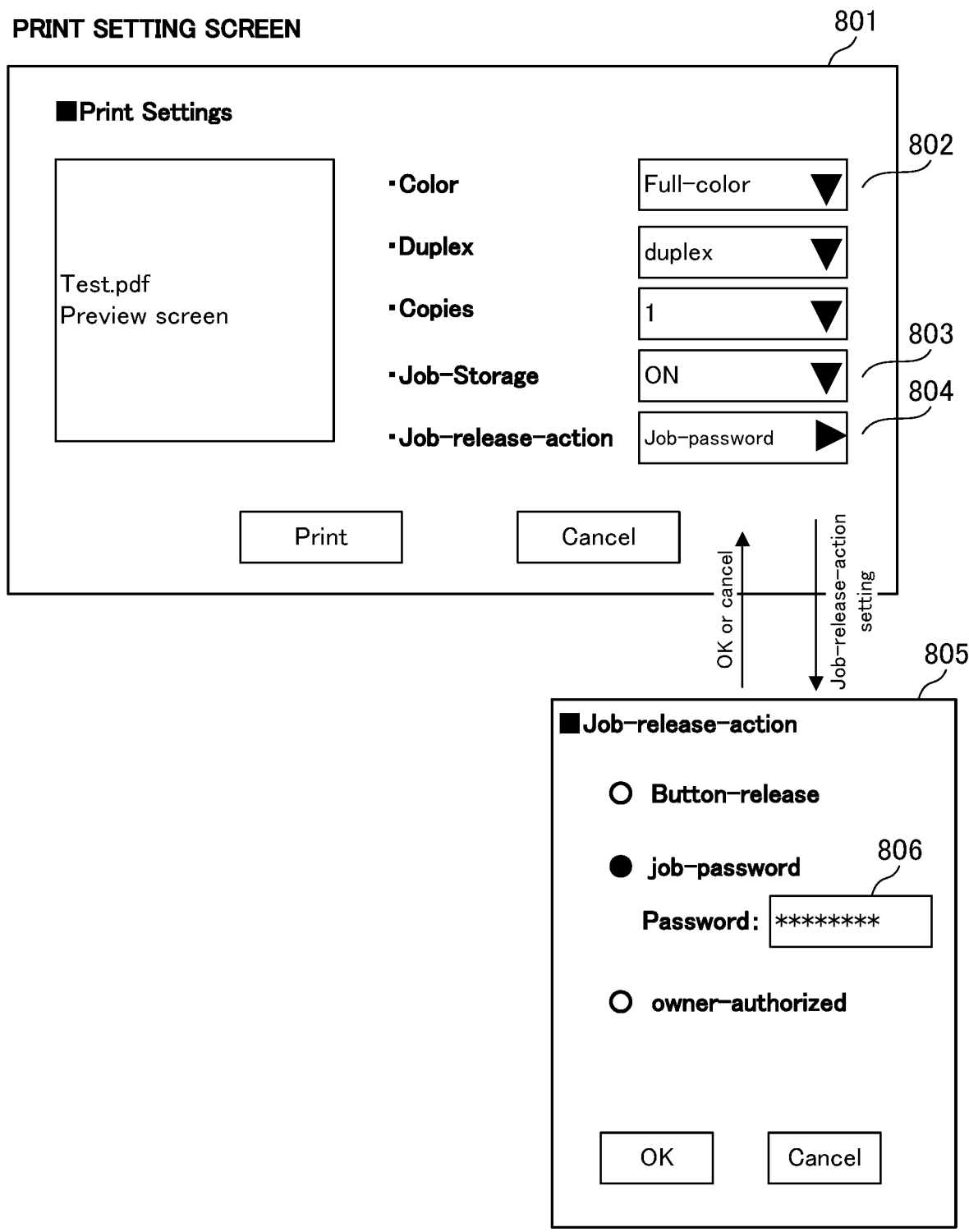

FIG. 10A (A) Print request packet (the case of secure job)

```
Version : 2.0
Operation : Print-Job          ← 901
Request-ID : 2

Operation-attributes-tag :
 requesting-user-name : sato   ← 902
 job-name : test.pdf           ← 903

Job-attributes-tag:            ← 904
 print-color-mode : moNOcrome
 copies : 1
 sides : two-sided-short-edge
 job-release-action : job-password   ← 905
 job-password : "XXXX"                ← 906
 <Print data>
```

FIG. 10B (A) Print request packet (the case of hold printing)

```
Version : 2.0
Operation : Print-Job
Request-ID : 2

Operation-attributes-tag :
 requesting-user-name : sato
 job-name : test.pdf

Job-attributes-tag:                  ← 904
 job-originating-user-name : sato    ← 907
 print-color-mode : moNOcrome
 copies : 1
 sides : two-sided-short-edge
 job-release-action : user-authorized  ← 908
 <Print data>
```

FIG. 10C (A) Print request packet (the case of saved job)

```
Version : 2.0
Operation : Print-Job
Request-ID : 2

Operation-attributes-tag :
 requesting-user-name : sato
 job-name : test.pdf

Job-attributes-tag:
 print-color-mode : moNOcrome
 copies : 1
 sides : two-sided-short-edge
 job-storage-action : button-release   ← 909
 <Print data>
```

FIG. 13A (A) Capability query request packet

Version : 2.0
Operation : Get-Printer-Attributes
Request-ID : 1

Operation-attributes-tag :
Requested-attributes:
 operations-supported
 color-supported
 copies-supported
 sides-supported
 job-storage-supported
1101 —  job-release-action-supported
1102 —  job-storage-access-supported

FIG. 13B (B) Capability response packet (the case of supporting secure print)

Version : 2.0
Status-code : successful
Request-ID : 1

Operation-attributes-tag:
Printer-attributes-tag
 operations-supported : "create-job", "send-document", "cancel-job", "Get-Printer-attributes", "Get-Job-attributes", "print-job"
 color-supported : true
 copies-supported : 1 - 9999
 sides-supported : "one-sided", "two-sided-short-edge"
 job-storage-supported : "job-release-action", "job-storage-access"
1110 —  job-release-action-supported : "job-password", "owner-authorized", "button-release"
1111 —  job-storage-access-supported : "owner", "public"

PRINT SYSTEM PERMITTING USAGE OF PRINT DEVICE CAPABILITIES USING A STANDARD PRINT PROTOCOL AND RECORDING MEDIUM

BACKGROUND OF THE INVENTION

Field of the Invention

The present invention relates to a print system.

Description of the Related Art

In recent years, print systems have become popular in which a general-purpose print protocol provided in an OS of an information processing device is used when a print job is input from the information processing device such as a PC, a mobile terminal, and the like to a printing device, without via a dedicated printer driver provided from a vendor. PC is an abbreviation for "Personal Computer". IPP (Internet Printing Protocol) is known as an example of such a printing protocol (standard protocol) based on the standard in a general-purpose printing system. The information processing device and the print device realize the printing processing by communication according to the protocol in IPP.

In PWG (The Printer Working Group) that studies the specifications of IPP, the extension of a printing function that can be provided by the printing device including a storage area in which a print job can be stored has been studied. In "IPP Enterprise Printing Extensions v2.0 (EPX)" by the Printer Working Group, [PDF], dated on Apr. 23, 2021, Searched on Jan. 7, 2021, the Internet (https://ftp.pwg.org/pub/pwg/ipp/wd/wd-ipppx20-20210423.pdf), printing workflows using various extended printing functions that a printing device including a storage area can provide have been proposed, and a function that is not inferior to a dedicated printer driver with respect to an output mode in a general-purpose printing system by IPP is expected. Specifically, output methods for the print job for which saving to the storage area of the printing device has been specified including a method for selecting on an operation panel of the printing device, a method for requiring a password input during output, a method for requiring authentication, and the like are proposed.

In contrast, regarding printing devices, a printing device having a plurality of different output functions according to the purpose and intended use, as an output form of a print job that has been transmitted from the information processing device and stored (hereinafter, also referred to as "hold") in a storage area, is known.

For example, the printing device comprises hold printing in which a printed material can be prevented from being left unattended by temporarily holding a print job and enabling selecting only the print job of a user who has performed authentication with an IC card and the like as an output target. IC is an abbreviation for "Integrated Circuit". Additionally, the printing device is equipped with a saved job that stores as image data in an area referred to as a user box (hereinafter, referred to simply as a "box"), which enables the combination of a scanned image and a print job and transmission to an external device by e-mail, SMB, and the like. An e-mail is an electronic mail. SMB is an abbreviation for "Server Message Block". It has been common to use a dedicated printing protocol according to the intended use and purpose by vendor-specific printer drivers that are provided from each of venders of the printing device so that various printing workflows utilizing such a storage area of the printing device are realized.

Additionally, Japanese Patent Application Laid-Open No. 2019-196018 discloses a printing device that can switch between holding a print job and performing print as is depending on the type of print jobs (PC print or cloud print), print setting conditions, or print protocols (LPR/RAW/IPP, and others). LPR is an abbreviation for "Line Printer Daemon protocol".

Even when a workflow is provided in which print jobs are saved in a storage area that the printing device provides by using a general-purpose printing protocol such as IPP and printing is performed, control of print jobs matching the intended use and purpose of various functions that the printing device provides is expected. This is because it is desirable that, even when a general-purpose printing protocol is used, the same usability as the case in which a print job is input from a dedicated printer driver that the vendor of the printing device provides is provided to the user.

Therefore, in a printing device, a capability response that conforms to the protocol specifications defined as a standard including IPP is performed, while, in an information processing device, it is necessary to generate a print job by specifying a print attribute by which the printing function can be appropriately controlled according to the capability response performed by the printing device.

In the conventional technology as disclosed in Japanese Patent Application Laid-Open No. 2019-196018, it is possible to select whether or not to hold the print job in the storage area of the printing device according to the type of print jobs, and the like. However, no mechanism for saving the print job in a mode matching the intended use and purpose according to the general attributes specified to the print job that has been input from general print clients such as IPP and the like has been conceived.

Therefore, when a print job input from a general-purpose print client including IPP and the like is stored, association with an output function that matches the user intention that has existed, that is, the print workflow that is desired to be realized and the purpose of holding the print job is impossible. In other words, the print job stored in the storage area of the printing device cannot be handled by a general-purpose print client including the IPP and the like by the printing function provided in the printing device. For this reason, there is a concern that the user convenience may decrease, compared to the job input performed by the dedicated printer driver that has been used conventionally.

SUMMARY OF THE INVENTION

The present invention provides a print system in which a print job can be generated by specifying a printing attribute by which a printing function can be appropriately controlled according to a capability response by a printing device.

A printing system of one embodiment of the present invention is a printing system comprising a printing device and a client device that performs an output instruction of a print job on the printing device by a standard protocol, the printing device comprising: a storage has a storage region in which a print job can be stored as a saved job; a memory storing instructions; and a processor executing the instructions causing the printing device to: perform a response regarding attribute information indicating that storage of the saved job is possible and accompanying support attribute information by using the standard protocol, in response to a capability information request from the client device, and the client device comprising: a memory storing instructions;

and a processor executing the instructions causing the client device to: add the attribute information corresponding to an instruction from a user as an attribute of the print job if a capability response indicating that the storage of the saved job is possible is received from the printing device.

Further features of the present invention will become apparent from the following description of exemplary embodiments with reference to the attached drawings.

BRIEF DESCRIPTION OF THE DRAWINGS

FIG. 6 is a flowchart showing the generation procedure of printing capability response packet by the printing device 100.

FIG. 7A is a diagram showing an example of a packet that queries a printing capability. FIG. 7B is a diagram showing an example of a packet that responds with the printing capability. FIG. 7C is a diagram showing an example of a packet that responds with the printing capability.

FIG. 8 is a flowchart of the processing for generating print jobs in the printing system shown in FIG. 1.

FIG. 9 is a diagram showing an example of a print setting screen that is displayed by a print screen control unit 321 of the client device 101.

FIGS. 10A to 10C are diagrams showing an example of a packet of an IPP print job that a print job control unit 326 outputs in S408. FIG. 10A is a diagram showing a print request packet that instructs a secure job. FIG. 10B is a diagram showing a print request packet that instructs hold printing. FIG. 10C is a diagram showing a print packet that instructs a saved job.

FIG. 13A is a diagram showing an example of a packet that queries a printing capability in the second embodiment. FIG. 13B is a diagram showing an example of a packet that responds with the printing capability in the second embodiment.

DESCRIPTION OF THE EMBODIMENTS

Below, the embodiments for carrying out the present invention will be explained below with reference to drawings. Note that the embodiments below do not limit the claimed invention and not all combinations of features explained in the embodiments are essential to the means of solving the invention.

First Embodiment

Figure 1:
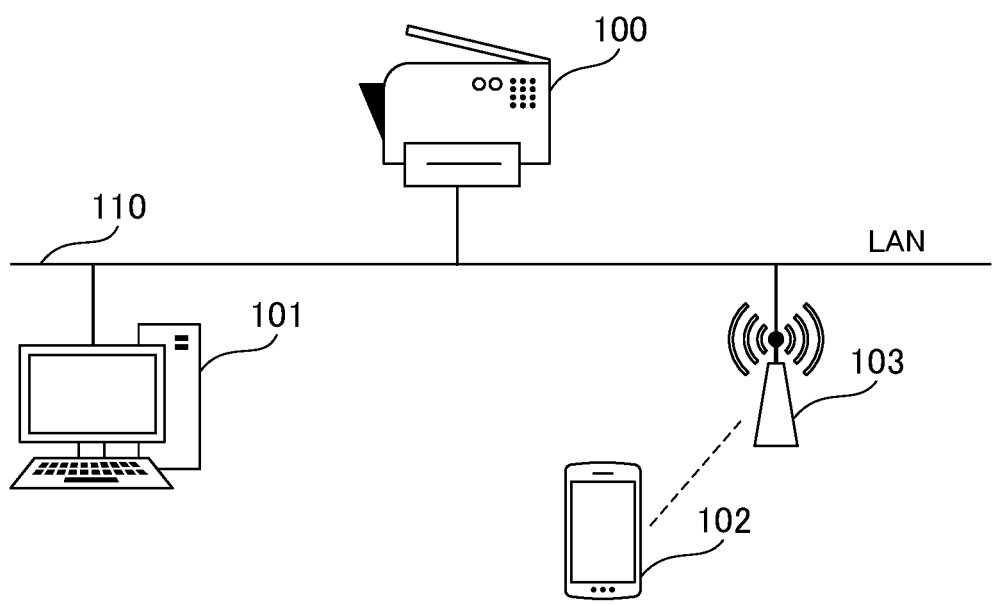
FIG. 1 is a diagram showing a configuration of a printing system according to the first embodiment of the present invention.

FIG. 1 is a diagram showing a configuration of a print system according to the first embodiment of the present invention. The printing system according to the present embodiment includes a printing device 100 and the client device 101 such as a PC and others. The printing device 100 communicates with the client device 101 via a network 110. The network 110 may be configured by a combination of, for example, communication network such as a LAN and a WAN, communication by USB, a cellular network (for example, LTE, 5G, and the like), a wireless network conforming to IEEE 802.11, and the like. That is, a network 100 needs only be capable of transmitting and receiving data, and any physical layer communication method may be adopted. Furthermore, LAN is an abbreviation for "Local Area Network". WAN is an abbreviation for "Wide Area Network". USB is an abbreviation for "Universal Serial Bus". LTE is an abbreviation for "Long Term Evolution". 5G is an abbreviation for "5th generation mobile communication system". IEEE is an abbreviation for "Institute of Electrical and Electronics Engineers".

The printing device 100 in the present embodiment is also communicably connected to a mobile terminal 102 via a wireless access point 103 that is connected to the network 110, and communicably connected by using a predetermined communication protocol.

The printing device 100 has a scanning function of externally transmitting data based on images obtained by the reading with a scanner, a print function of printing images on sheets such as paper based on the print job that has been received from an external device, and a copy function. In the present embodiment, although an example of an MFP (Multi Function Peripheral) having a plurality of functions is shown as an example of the printing device, the present invention is not limited thereto. For example, an SFP (Single Function Peripheral) of a single-function having only a printing function may be adopted. Additionally, although, in the present embodiment, print on sheets such as paper is shown as an example, the present invention is not limited thereto, and the present invention can also be applied to a print device in which rolled paper is used.

Additionally, the printing device 100 in the present embodiment has a storage area for print job. The printing device 100 is provided with a storage such as an HDD, and a storage area for print job is provided in this storage. The printing device 100 saves print jobs in this storage area and a user can select the print jobs at any time and execute print processing. Note that HDD is an abbreviation for "Hard Disc Drive".

The client device 101 and the mobile terminal 102 each have a function of transmitting a print job to the printing device 100. Additionally, the client device 101 and the mobile terminal 102 are provided with a printing protocol by IPP that has been installed in advance as a part of the OS. OS is an abbreviation for "Opening System". In the print system, a plurality of client devices 101 and the mobile terminals 102 may be provided.

In recent years, print functions such as AirPrint and Mopria that are pre-installed on the client device 101 and the mobile terminal 102, which are examples of printing functions using IPP, have become popular.

<Hardware Configuration of Printing Device 100>

Figure 2:
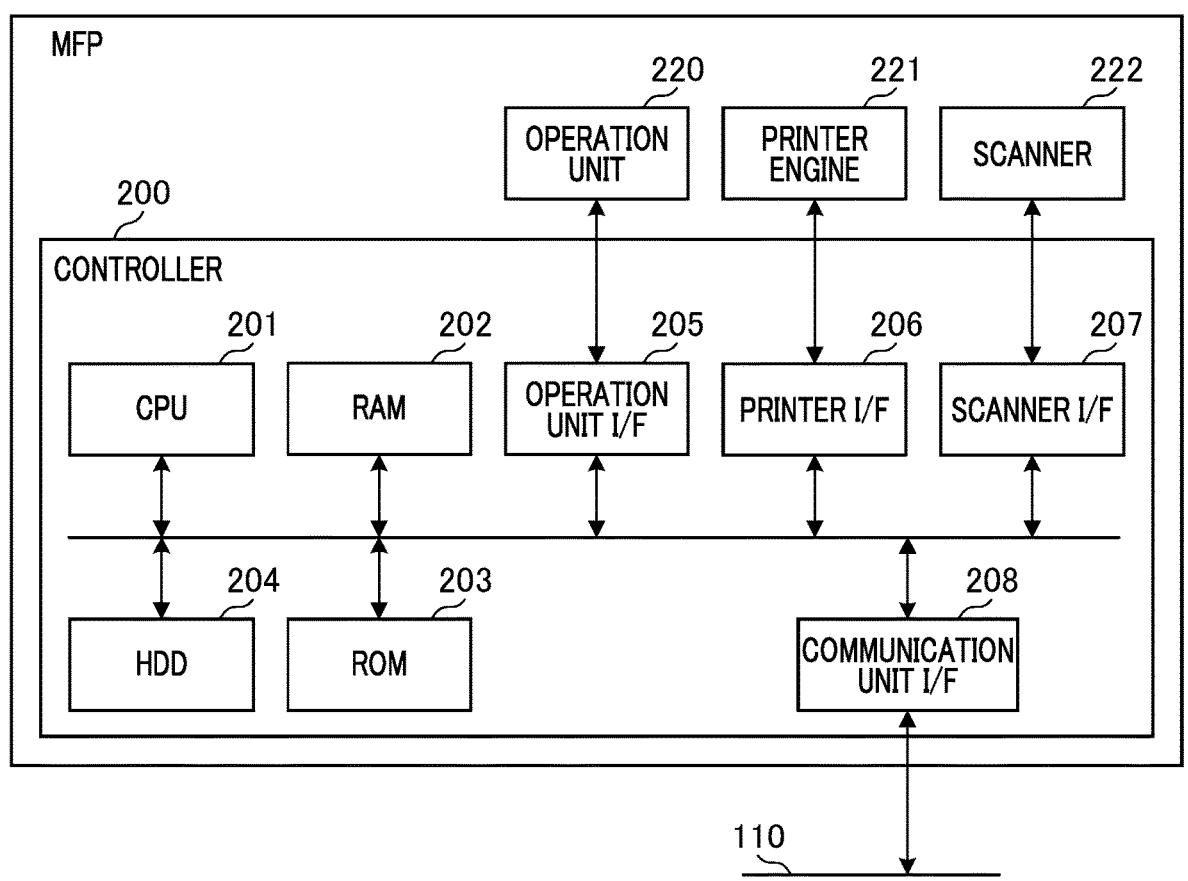
FIG. 2 is a block diagram showing a hardware configuration of a printing device 100 shown in FIG. 1.

FIG. 2 is a block diagram showing a hardware configuration of the printing device 100 shown in FIG. 1. The printing device 100 includes the controller 200 serving as a control unit that controls the operation of the entire printing device 100, an operation unit 220, a printer engine 221 serving as a printer that executes printing, and a scanner 222.

The controller 200 has a CPU 201, a RAM 202, a ROM 203, an HDD 204, an operation unit I/F 205, a printer I/F 206, a scanner I.T 207, and a communication unit I.T 208. Note that CPU is an abbreviation for "Central Processing Unit". RAM is an abbreviation for "Random Access Memory". ROM is an abbreviation for "Read Only Memory". I/F is an abbreviation for "Interface".

The CPU 201 reads out and executes a control program stored in the ROM 203 or the HDD 204 and performs various controls such as communication control and image processing to be described in detail below. Additionally, the ROM 203 stores various print settings that have been input from an operation control unit 301 to be described below. The RAM 202 is used as the main memory of the CPU 201 and a temporary storage area of a work area and the like. The HDD 204 is a nonvolatile storage means that stores control programs that the CPU 201 executes and various data for executing various functions. The HDD 204 is also used for storing image data that have been generated by the print processing and the copy processing. Furthermore, the HDD 204 has an area for temporarily storing the print job that has been input from an external device (hereinafter, simply referred to as a "storage area").

The printer I/F 206 is an interface that connects the printer engine 221 and the controller 200. The printer engine 221 is provided with a printer control unit (not illustrated) that performs control of the printer engine 221 independently from the controller 200. The printer engine 221 forms an image on a sheet fed from a paper feed cassette (not illustrated) by using a known electro-photographic method, based on image data that have been input via the printer I/F 206.

The scanner I/F 207 is an interface that connects the scanner 222 and the controller 200. The scanner 222 reads a document placed on a document stand and generates image data. The image data generated by the scanner 222 are printed by the printer engine 221, stored in the HDD 204, and transmitted to an external device via the communication unit I/F 208.

The operation unit I/F 205 is an interface that connects the operation unit 220 and the controller 200. The operation unit 220 is comprised by an LCD panel that functions as an operation panel for receiving various operation instructions from a user and also functions as a display unit for displaying various setting values and the device status on the printing device 100.

Furthermore, the CPU 201 controls a LAN controller (not illustrated) via the communication unit I/F 208 and realizes network communication with an external device on the network 110. As a part of this network communication processing, the controller 200 controls the response to the capability request provided by the printing device by the IPP protocol to be described below and the reception of print jobs in IPP.

<Software Configuration of Printing Device 100>

Figure 3A:
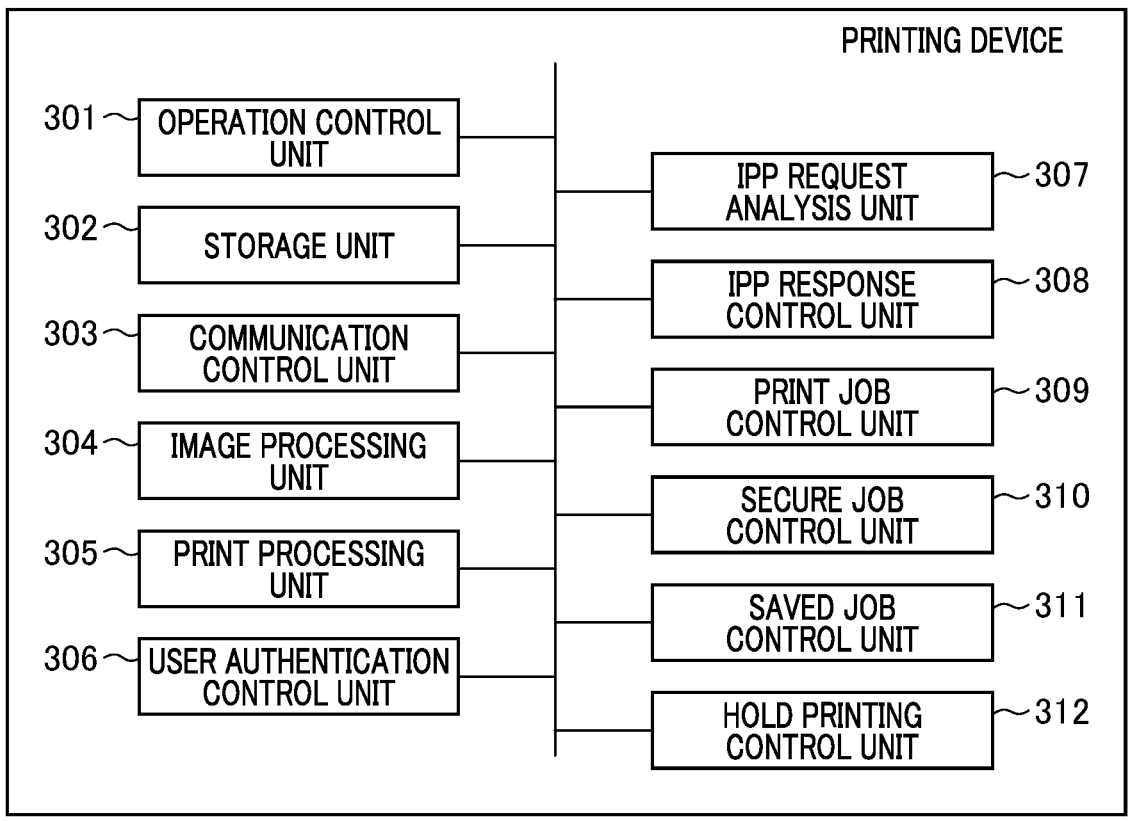
FIG. 3A is a block diagram showing a functional configuration realized by software that a controller 200 of the printing device 100 executes.

FIG. 3A is a block diagram showing a functional configuration realized by software that the controller 200 of the printing device 100 executes. The functional configuration shown in FIG. 3A is realized by the CPU 201 reading a program stored in the ROM 203 or the HDD 204 and executing the program. The printing device 100 has the operation control unit 301, a storage unit 302, a communication control unit 303, an image processing unit 304, a print processing unit 305, and a user authentication control unit 306. The printing device 100 further has an IPP request analysis unit 307, an IPP response control unit 308, a print job control unit 309, a secure job control unit 310, a saved job control unit 311, and a hold printing control unit 312.

The operation control unit 301 controls the operation unit 220. The operation control unit 301 displays an operation screen including printing settings on the operation unit 220. Additionally, the operation control unit 301 detects input instructions from user operation based on a pressing state of operation buttons and the like on the operation screen displayed on the operation unit 220, and receives input of setting values linked to screen components such as an operation button and the like and an execution instruction for various processing.

The storage unit 302 is a file system control unit. The storage unit 302 stores specified data in the ROM 203 and the HDD 204 according to an instruction from another control unit. Additionally, the storage unit 302 reads out the data stored in the ROM 203 and the HDD 204 according to an instruction from another control unit. In the present embodiment, the storage unit 302 stores, for example, a print job in which storage specification has been performed and performs readout of a print job in response to an output instruction, according to an instruction from the print job control unit 309.

The communication control unit 303 controls the communication unit IIF 208 and performs network communication with an external device according to communication protocols such as TCP/IP. The communication control unit 303 in the present embodiment performs packet processing conforming to various communication protocols including the IPP protocol to be processed by the IPP request analysis unit 307 and the IPP response control unit 308.

The image processing unit 304 analyzes the print job that the print job control unit 309 has received and generates page image data for output as a video signal to the printer engine 221.

The print processing unit 305 controls the printer engine 221 via the printer I/F 206. The print processing unit 305 transmits a video signal corresponding to the page image data that the image processing unit 304 has generated to the printer engine 221, and performs output of the print job based on the electrophotographic process.

The user authentication control unit 306 communicates with an IC card reader and performs the authentication processing for a user who uses the printing device 100. The hold printing control unit 312 compares user information that has been authenticated by the user authentication control unit 306 and user information included in the print job that is held in the HDD 204. The hold printing control unit 312 displays only the print jobs in which the user information included in the print job matches the user information that has been authenticated by the user authentication control unit 306, from among the print jobs that are held in the HDD 204, in the operation unit 220.

The IPP request analysis unit 307 performs the analysis processing of request content from the client device 101 and the like using the IPP protocol.

The IPP response control unit 308 generates an IPP response to a request from the client device 101 and the like based on the analysis result by the IPP request analysis unit 307 and returns the response. The IPP response control unit 308 responds, for example, to a Get-Printer-Attribute request by listing the capability information of the printing device 100.

The print job control unit 309 provides a print function by processing a print job that has received from the client device 101 and the like. For example, when the received packet is an IPP protocol, the print job control unit 309 causes the IPP request analysis unit 307 to analyze the packet, and when the result of analysis is a Print-Job operation in IPP, the print job control unit 309 calls the print processing unit 305 to execute the print processing. Here, when the IPP request analysis unit 307 determines that a specification of holding the print job, as a print attribute, is included in the received packet, it provides an instruction for performing only storing the print job to the print job control unit 309. Subsequently, the print job control unit 309 calls a printing application to be described below that is appropriate for the processing method of the print job, based on the content instructed as a print attribute.

Note that the print job control unit 309 in the present embodiment is configured to also support various printing protocols such as LPR/RAW/IPP and the like and vender-specific job control protocols, and to enable processing print jobs from the printer driver that is provided by the vendor. In addition, the print job control unit 309 also includes an analysis unit that analyzes requests made by each of the print protocols as in IPP, and a response unit that responds to the request (both units are not illustrated). Furthermore, the print job control unit 309 also includes an analysis unit and a response unit (both are not illustrated) of other network protocols such as mDNS and WSD and the like used for searching printing devices. mDNS is an abbreviation for "multicast Domain Name System". WSD is an abbreviation for "Web services on devices".

The secure job control unit 310, the saved job control unit 311, and the hold printing control unit 312 are control units that function as a print application that can be provided when the printing device 100 supports a job-storage attribute for storing print jobs. The secure job control unit 310, the saved job control unit 311, and the hold printing control unit 312 are called from the print job control unit 309 and execute each function.

The secure job control unit 310 is a printing application that realizes a secure job that requires a password input in the operation unit 220 of the printing device 100 during output. When receiving a print job in which a password has been specified as a printing attribute, the secure job control unit 310 stores the print job in the HDD 204 as a secure job, instead of printing the print job as it is. Additionally, the secure job control unit 310 requests the password input by the operation unit 220 during receipt of an output instruction of the secure job stored in the HDD 204. The secure job control unit 310 permits printing when the password that has been input matches the password included in the job attribute. Furthermore, the secure job control unit 310 also has a function of encrypting print jobs.

The saved job control unit 311 is a print application that stores and manages image data generated by analyzing and scanning print jobs in a storage area (box) that is assigned to the HDD 204. The saved job control unit 3311 stores, as an object in a box, the print job for which storage to a box is indicated as a print attribute in printing instructions from the client device 101. The saved job control unit 311 can change the printing attributes of the number of copies to be printed and the like during print of image data that have been stored in the box according to user operation instructions in the operation unit 220. Additionally, the saved job control unit 311 can transmit the image data stored in the box to an external device by FAX, SMB file transmission, e-mail, and the like. FAX is an abbreviation for "facsimile". Note that, in the saved job control unit 311, access restriction by user authentication and the like is not provided to the image data stored in the box so that the image data can be shared by a plurality of users.

The hold printing control unit 312 is a print application for realizing hold printing. The hold printing control unit 312 holds a print job to which user information has been added as a printing attribute. Additionally, the hold printing control unit 312 allows the user who has been authenticated with an IC card and the like to select only the print jobs for which user information is matched from among saved print jobs on the operation unit 220, and the function of preventing a printed material from being left unattended is provided. Additionally, in hold printing, the hold printing control unit 312 can forcibly hold all print jobs depending on the setting of the printing device 100.

As described above, the printing device 100 is provided with a storing method of print jobs by different methods, by using different areas within the storage unit 302 according to the provided function. That is, the printing device 100 can store the print jobs in different areas within the storage unit 302 according to the attributes of the print job.

<Software Configuration of Client Device 101>

Figure 3B:
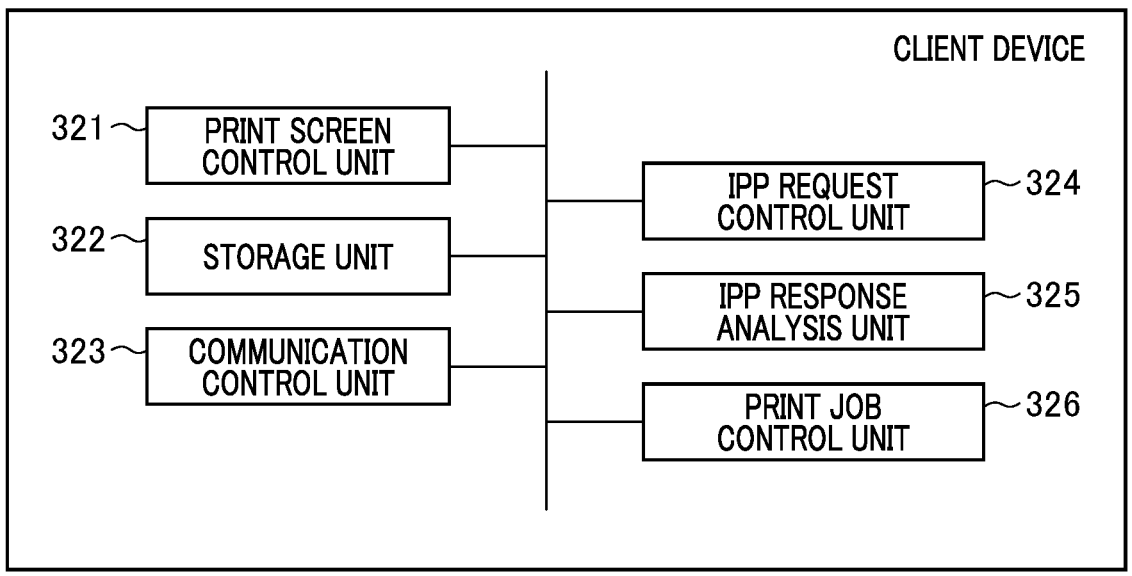
FIG. 3B is a block diagram showing a functional configuration realized by software that a client device 101 executes.

FIG. 3B is a block diagram showing a functional configuration realized by software that the client device 101 executes. The functional configuration shown in FIG. 3B is realized by the CPU (not illustrated) provided by the client device 101 reading and a program prepared for the client device and executing the program. The client device 101 has the print screen control unit 321, a storage unit 322, a communication control unit 323, an IPP request control unit 324, an IPP response analysis unit 325, and the print job control unit 326. Note that although the client device 101 may have a configuration of an operating system and the like that control the entire client device 101 overall in response to input control by keyboard operation and various requests from various applications, the description thereof will be omitted.

When the user selects print from an operation menu of various applications, the print screen control unit 321 controls the print screen displayed on the display unit (not illustrated) of the client device 101, and receives an inputs of various print settings. In the present embodiment, it is assumed that the print screen control unit 321 operates as a part of the OS that controls the entire client device 101 using IPP.

The storage unit 322 is a file system control unit that stores specified data on the HDD and the like (not illustrated) or reads out stored data according to an instruction from another control unit, and is generally implemented as a part of the OS. In the present embodiment, the storage unit 322 stores at least a print job generated by a print instruction from an application.

The communication control unit 323 is a control unit that performs packet processing conforming to various communication protocols and realizes communication with the printing device 100, and provides a function equivalent to the communication control unit 303 of the printing device 100.

The IPP request control unit 324 performs various requests to the printing device 100 by using the IPP protocol. For example, the IPP request control unit 324 performs a Get-Printer-Attribute request as a capability information request to query functions that the printing device 100 supports. Additionally, for example, the IPP request control unit 324 receives print settings that reflect the content of user instruction from the print screen control unit 321 and generates a print attribute according to IPP.

With respect to the request of the IPP request control unit 324, an IPP response analysis unit 325 analyzes the IPP response result to which the printing device 100 has responded. The IPP response analysis unit 325 acquires a printing attribute (capability response) that is supported by the printing device 100 when the IPP response result is a Get-Printer-Attribute response. The print screen control unit 321 displays, as options, only functions that the printing device 100 can process on the printing screen according to the analysis results of the IPP response analysis unit 325. For example, if the printing device 100 is provided with storage such as the HDD 204 and the like and has the capability of storing and holding print jobs, the printing device 100 returns the attributes such as Job-storage and the like as the operation attributes of IPP. Specifically, when the printing device 100 supports secure jobs, as the capability response, the printing device 100 responds by including job-password in the job-release-action-supported attribute. In this case, the IPP response analysis unit 325 reports that the job-password attribute can be specified to the print screen control unit 321, and the specification of secure job can thereby be performed on the print setting screen.

The print job control unit 326 generates a print job described by IPP and controls printing for the printing device 100. Here, the print job control unit 326 reflects the print settings that have been received from the print screen control unit 321 in the print attributes of the print job. The print job control unit 326 is an example of a printing instruction control means.

<Sequence Example of Print Job: Capability Response>

Figure 4:
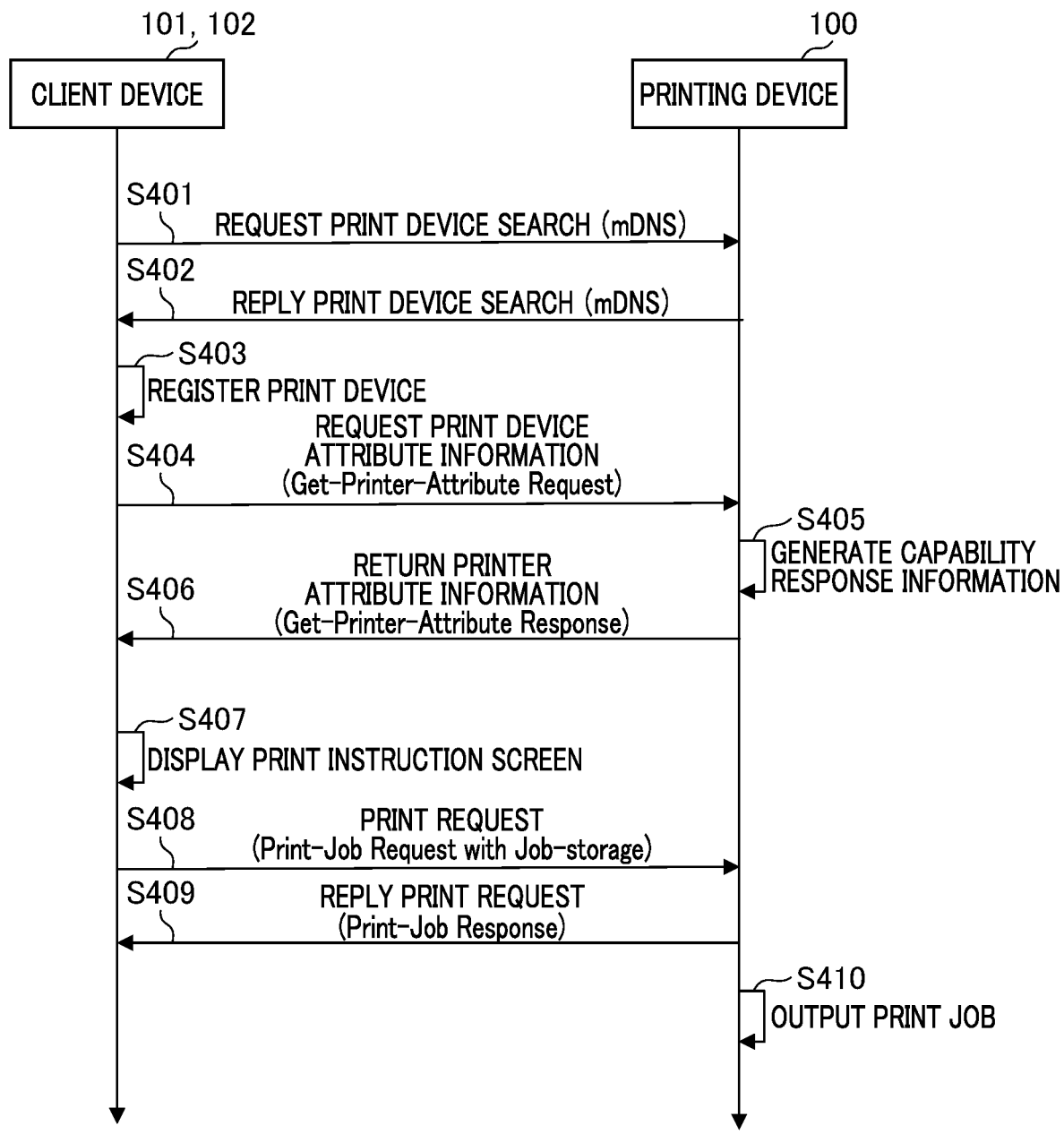
FIG. 4 is a sequence diagram showing processing related to the generation of a print job conforming to IPP in the printing system shown in FIG. 1.

FIG. 4 is a sequence diagram showing processing related to the generation of print jobs conforming to IPP, in the printing system shown in FIG. 1. FIG. 4 shows a process for printing from the client device 101 to the printing device 100. Below, the examples of the processing that the printing device 100 and the client device 101 perform and the print setting screen, and the content of the IPP packets that are exchanged will be described together below, in each step of the sequence in FIG. 4, with reference to the drawings in FIG. 5 to FIG. 10C.

First, the user performs a print device registration operation for the printing device 100 by using the client device 101. The print device registration operation by the user includes a procedure for instructing print device search from the print setting screen of the client device 101. The client device 101 that has received the print device registration operation by the user searches print devices present on the network 110, and displays a list of printing devices that have been found through search.

In the printing device search procedure, the client device 101 transmits printing device search request S401 by using mDNS. The client device 101 requests a response from a printing device that supports IPP by, for example, performing multicast transmission of a query message in mDNS. When the printing device 100 receives printing device search request S401, it returns printing device search response S402 that includes information indicating support of IPP.

When there are a plurality of printing devices that support IPP in the network 110, the client device 101 displays a list of the plurality of printing devices that have received the printing device search response S402 on the print setting screen. The user selects one desired printing device from the list of the printing device and performs a printing device registration instruction (S403). In the following, the explanation will be given by assuming that the printing device 100 is selected.

The IPP request control unit 324 of the client device 101 that has received the printing device registration instruction transmits a detailed printing capability query (printing device attribute information request) by IPP to the selected printing device 100 (S404). The query about printing capability by the print device attribute information request is performed by, for example, Get-Printer-Attributes operation of IPP. When the printing device 100 recognizes that the received packet is a print device attribute information request through analysis by the IPP request analysis unit 307, it generates capability response information by the IPP response control unit 308 (S405). The printing device 100 transmits a printing device attribute information response including capability response information generated by the IPP response control unit 308 to the client device 101 (S406). The response of printing ability by the printing device attribute information response is performed by, for example, Get-Printer-Attributes response of IPP.

<Examples of Printing Ability Query Request Packet and Printing Ability Response Packet>

FIG. 7A is a diagram showing an example of a packet that queries printing capability. FIG. 7B and FIG. 7C are diagrams showing an example of a packet that performs a response regarding printing capability.

FIG. 7A shows Get-Printer-Attributes operation 601 of IPP, as an example of the packet that queries printing capability. The IPP request control unit 324 of the client device 101 generates Get-Printer-Attributes operation 601 shown in FIG. 7A.

In the example shown in FIG. 7A, ability information to be acquired is specified by Requested-Attributes attribute 602, and the operation that the printing device 100 supports is queried by the operation-supported attribute 603. Additionally, in the example of FIG. 7A, what functions are supported as print jobs to be stored in the storage of the printing device 100 is queried by job-storage-supported 604. Furthermore, in the example of FIG. 7A, what method is used to enable outputting the printing job that the printing device 100 has stored is queried by job-release-action-supported 605.

The IPP request analysis unit 307 of the printing device 100 analyzes the content of the packet that queries printing capability. The IPP response control unit 308 generates a printing capability response packet shown in FIG. 7B or FIG. 7C based on the analysis results performed by the IPP request analysis unit 307 (S405), and transmits the printing capability response packet to the client device 101 (S406). The printing capability response packet includes capability information indicating that the printing device 100 can store a saved job and accompanying support attribute information.

When the printing device 100 has a function of storing print jobs, two attributes of job-release-action and jobstorage-access are included in job-storage-supported 611. In addition, in each attribute, values corresponding to a function that enables support by using the storage of the printing device 100 are listed. Additionally, the values listed in each attribute can be specified as attributes of Print-Job, which is one of the acceptable operations listed in Options-Supported 610.

In the example shown in FIG. 7B, "job-password", "owner-authorized", and "button-release" are listed as job-release-action-supported attribute 612. "job-password" indicates that the printing device 100 supports secure jobs that require a password. "owner-authorized" indicates that the printing device 100 supports hold printing that requires user authentication. "button-release" indicates that the printing device 100 supports saving to a box.

In the example shown in FIG. 7C, only "job-password" is included as job-release-action-supported attribute 613. Therefore, the printing capability response packet in FIG. 7C indicates that the printing device 100 supports only secure jobs. This printing capacity response packet corresponds to, for example, a case in which the printing device 100 is an SFP or the like that does not have a large-capacity HDD, and hold printing, and saving to box cannot be supported.

<Capability Response Processing of Printing Device>

Figure 5:
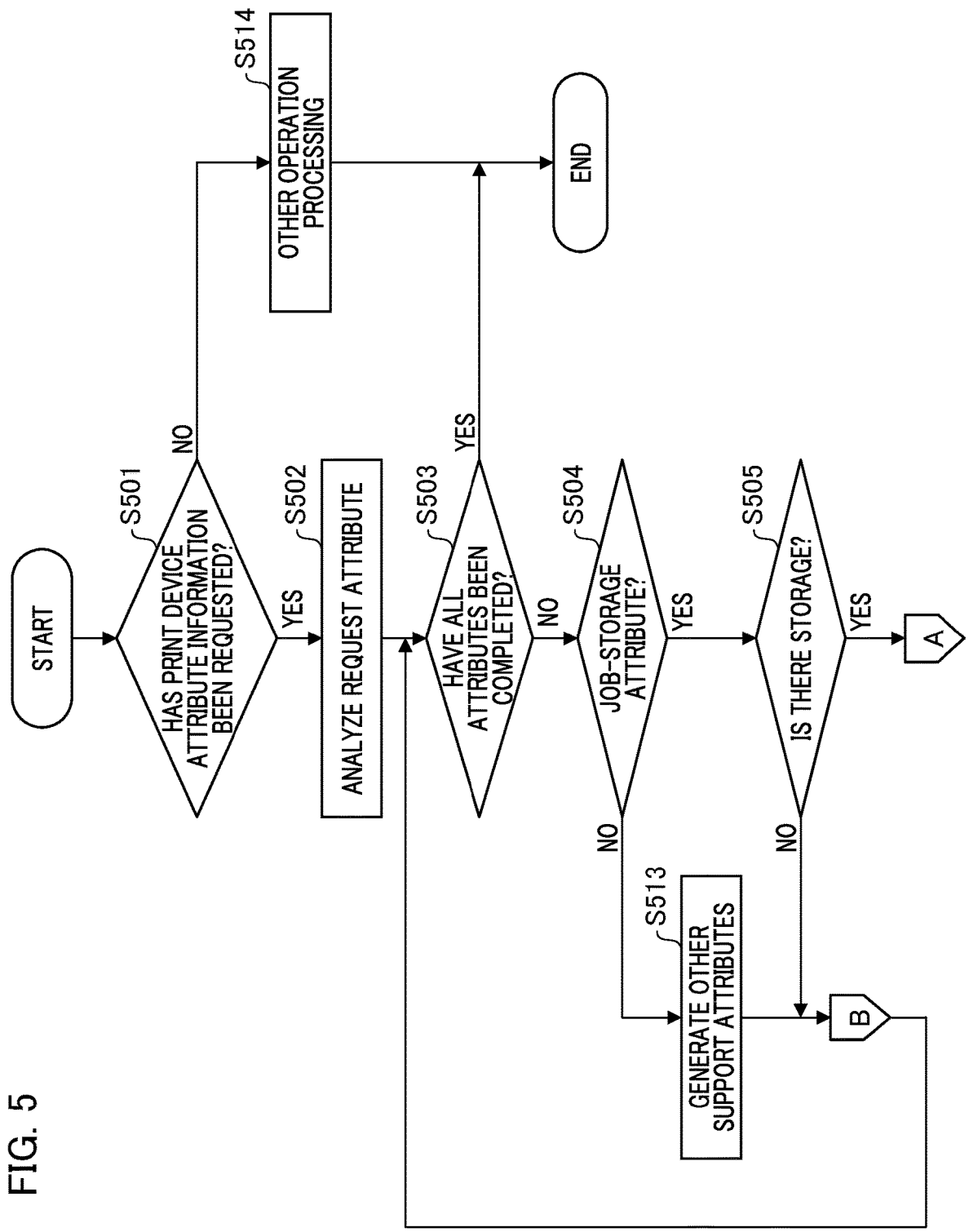
FIG. 5 is a flowchart showing the generation procedure of printing capability response packet performed by the printing device 100.

FIG. 5 and FIG. 6 are flowcharts showing the generation procedure of a printing capability response packet by the printing device 100. The flowcharts in FIG. 5 and FIG. 6 are flowcharts showing the procedure when the IPP request analysis unit 307 and the IPP response control unit 308 of the printing device 100 generate a response packet in S405 in FIG. 4. The processing shown in FIG. 5 and FIG. 6 is realized by the CPU 201 reading out a program on which the operation of each configuration shown in FIG. 3A has been described from the ROM 203 or HDD 204 and executing the program.

First, the IPP request analysis unit 307 confirms whether or not the received IPP packet is the request of printing capability (printing device attribute information) (S501), and when the received IPP packet is the request of printing capability, what is specified as an attribute to be responded to as printing ability is analyzed (S502). The IPP request analysis unit 307 provides a notification regarding the analysis results from process in S502 to the IPP response control unit 308. In contrast, in S501, if the received IPP packet is not the request of printing capability, the IPP request analysis unit 307 completes the processing after processing of other IPP packets (S514).

Next, an IPP response control unit 308 repeats the processes from S503 to S513 based on the analysis result reported from the IPP request analysis unit 307 until the processing for all the attributes that have been requested as printing capability is completed (YES in S503), and generates a response packet.

When the analysis result reported from the IPP request analysis unit 307 includes a capability request regarding job-storage (YES in S504), the IPP response control unit 308 confirms whether or not the printing device 100 includes storage in which print jobs can be saved (S505). In the present embodiment, the determination is made based on whether or not "job-release-action-supported" is specified in Requested-attributes. Note that even if all attributes are requested as printing capability, the determination in S504 is YES and the process proceeds to S505.

When the determination in S504 is NO, the IPP response control unit 308 determines the support status of other printing attributes such as "color-supported" and the like, as shown in FIG. 7B and FIG. 7C, and generates a response packet (S513). Subsequently, the IPP response control unit 308 returns to S503 so that the next printing attribute is processed. Additionally, the IPP response control unit 308 returns to S503 so that the next print attribute is processed even when the IPP response control unit 308 determines that storage is not present in S505 because the attribute related to job-storage needs not be included as the response content.

In contrast, when the printing device 100 is provided with storage (YES in S505), the IPP response control unit 308 advances the processing to S506 in FIG. 6. In S506, the IPP response control unit 308 generates a job-storage-supported response packet as an attribute indicating that the capability related to "job-storage" is provided.

Next, the IPP response control unit 308 checks the operating status of the print applications including the saved job control unit 310, the stored job control unit 311, and the hold printing control unit 312, and generates a response packet as a capability response in which the operating status is reflected. In the present embodiment, print settings for enabling or disabling each of the print applications are provided in the ROM 203, and determination is performed by the IPP response control unit 308 reading out these print settings.

When the secure job is enabled (YES in S507), the IPP response control unit 308 adds job-password to a supporting job attribute job-release-action-supported (S508).

When hold printing is enabled (YES in S509), the IPP response control unit 308 adds owner-authorized to job-release-action-supported (S510).

When save to box is enabled (YES in S511), the IPP response control unit 308 adds button-release to job-release-action-supported (S512).

According to the above processing, the response of the printing capability that appropriately reflects the support status of the printing application using the storage provided in the printing device 100 can be performed.

<Example of Print Job Sequence: Print Settings Screen>

FIG. 9 is a diagram showing an example of a print setting screen displayed by the print screen control unit 321 of the client device 101. The print screen control unit 321 of the client device 101, which has received the capability response from the printing device 100, displays a print setting screen 801 corresponding to the received printing capability (S407). Here, as an example, a case in which the client device 101 has received the packet shown in FIG. 7B as a capability response, will be described below.

Since the capability response of colorsupported=true indicates that color printing is possible, the "Color" setting 802 can be selected from two options of "full-color" and "mono" on the print setting screen 801. Additionally, since job-storage-supported attribute is included in the capability response, "Job-Storage" setting 803 (storage specification of print job) can be selected from two options of "ON" and "OFF" on the print setting screen 801.

Additionally, the function shown in a pop-up screen 805 can be selected by pressing a button 804 on the print setting screen 801 according to the output method of the print job listed in job-release-action-supported in the capability response. In the response result of printing capability shown in FIG. 7B, all the functions of secure job, hold printing, and save to box can be selected. Accordingly, each of the functions can be selected by a radio button on the pop-up screen 805. Note that, as shown in FIG. 9, when "job-password" indicating a secure job is selected, a password input by the user from the operation unit 220 during output is specified in an input field 806. The print screen control unit 321 displays the pop-up screen 805 upon receiving the pressing of the button 804 on the print setting screen 801, and the print screen control unit 321 returns the display to the display of the print setting screen 801 when a pressing of an "OK" button or a "Cancel" button on the pop-up screen 805 has been received.

<Example of Print Job Sequence: Print Instruction>

Subsequently, the print screen control unit 321 of the client device 101 receives the desired print settings by the user on the print setting screen 801, calls the print job control unit 326 by the pressing of "the Print" button, and advances the printing processing (S408). Specifically, the print job control unit 326 performs print instructions including job-storage attribute on the IPP request control unit 324, and the IPP request control unit 324 that has received this instruction generates a request packet including a corresponding a Print-job operation and outputs the request packet.

FIG. 8 is a flow chart of the processing for generating a print job in the print system shown in FIG. 1. The process shown in FIG. 8 corresponds to the processes shown in S406 to S408 in FIG. 4 in the client device 101. The process shown in FIG. 8 is realized by the CPU (not illustrated) of the client device 101 reading out a program on which the operation of each configuration shown in FIG. 3B has been described from the storage unit 322 and executing the program.

First, in S701, the IPP response analysis unit 325 analyzes the content of the response packet that has been received from the printing device 100 (corresponding to S406). The IPP response analysis unit 325 provides an instruction regarding items to be displayed on the print setting screen to the print screen control unit 321, according to the content of the analyzed response packet. In S702, the print screen control unit 321 displays the print setting screen 801 (corresponding to S407) according to the analysis content performed by the IPP response analysis unit 325.

In S703, the print screen control unit 321 waits for a printing instruction from the user. Specifically, the print screen control unit 321 waits for detection of the pressing of the 'Print' button on the print setting screen 801. If there is a print instruction from the user, the print screen control unit 321 advances the processing to S704. In S704, the print screen control unit 321 acquires a print instruction content specified on the print setting screen 801.

In S704, the print job control unit 326 receives the content of print instruction that the print screen control unit 321 have acquired. The print job control unit 326 generates a print job reflecting the content of a print instruction that has been received from the print screen control unit 321, in the processes following S705, and performs a printing request (corresponding to S408).

Specifically, if job-password is specified as job-release-action in the button 804 (YES in S705), the print job control unit 326 advances the processing to S706. In S706, the print job control unit 326 specifies an attribute required for secure printing as an attribute of the Print-Job operation. Here, in addition to at least the specification of at least "job-release-action: job-password", the print job control unit 326 specifies a password to be specified as a job-password attribute during printing. This password is desirably encrypted by a predetermined encryption algorithm.

If job-password is not specified as job-release-action in the button 804 (NO in S705), the print job control unit 326 advances the processing to S707. If owner-authorized is specified as job-release-action in the button 804 (YES in S707), the print job control unit 326 advances the processing to S708. In S708, the print job control unit 326 specifies an attribute required for hold printing as an attribute of the Print-Job operation. Here, in addition to the specification of job-release-action: owner-authorized, the print job control unit 326 specifies the job-originating-user-name attribute by which at least the user of the print job can be specified.

Furthermore, if button-release is specified as job-release-action in the button 804 (YES in S709), the print job control unit 326 advances the processing to S710. In S710, the print job control unit 326 specifies an attribute required for saving to box as an attribute of the Print-Job operation. In this case, in the print job control unit 326, at least job-release-action: button-release is specified.

<Example of Print Job Packet>

FIG. 10A to FIG. 10C are examples of packets of IPP print jobs that the print job control unit 326 outputs in S408. FIG. 10A is a diagram showing a print request packet that instructs a secure job. FIG. 10B is a diagram showing a print request packet that instructs hold printing. FIG. 10C is a diagram showing a print packet that instructs a saved job FIG. 10A illustrates a print request packet when job-release-action=job-password is specified in the button 804 in FIG. 9. Accordingly, in the print request packet shown in FIG. 10A, job-storage attribute 905 that instructs a secure job as job attribute 904 of Print-Job operation 901 and password 906 has been specified. Additionally, in the print request packet in FIG. 10A, requesting-user-name attribute 902 indicating the user information of the print job and job-name attribute 903 indicating the print job name are also specified. These are used for clearly indicating the print job when the input of the password is prompted in the printing device 100. In a print job, print data corresponding to the print job name is described in a data format that has been permitted in advance as a printing capability, and included in the subsequent packets.

FIG. 10B illustrates a print request packet when job-release-action=owner-authorized is specified in the button 804 in FIG. 9. Therefore, in the print request packet shown in FIG. 10B, job-storage attribute 908 that instructs hold printing is specified as the job attribute 904. In this case, job-originating-user-name attribute 907 indicating the owner of the print job is included so that only the print job input by the user who has performed user authentication with an IC card or the like is displayed. FIG. 10C shows a print request packet when job-release-action=button-release is specified in the button 804 in FIG. 9. Accordingly, job-storage attribute 909 instructing a saved job as a job attribute is specified in the print request packet in FIG. 10C.

<Example of Print Job Sequence: Receipt of Print Job>

Figure 11:
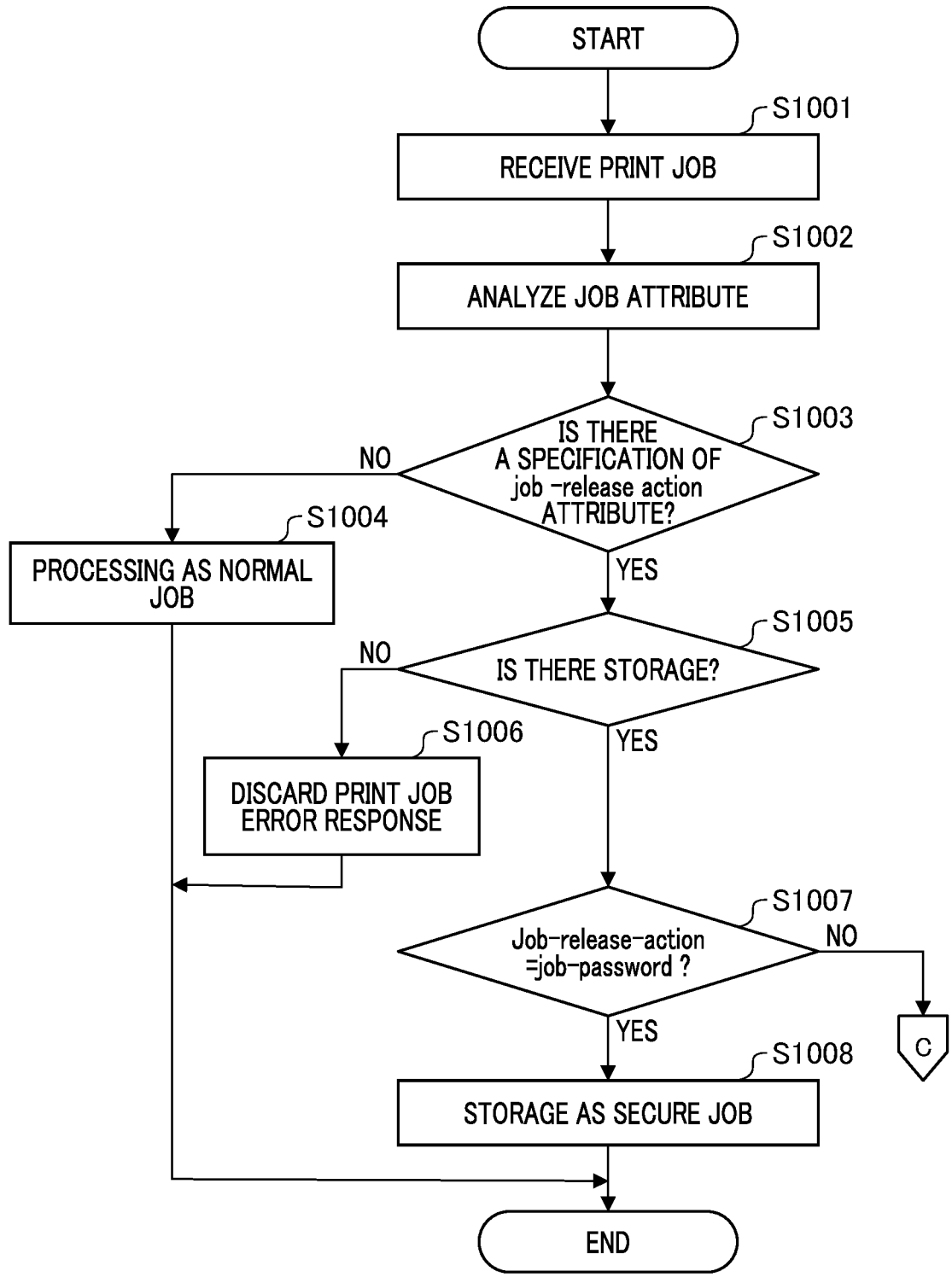
FIG. 11 is a flowchart showing the processing when the printing device 100 shown in FIG. 1 receives a print job.
Figure 12:
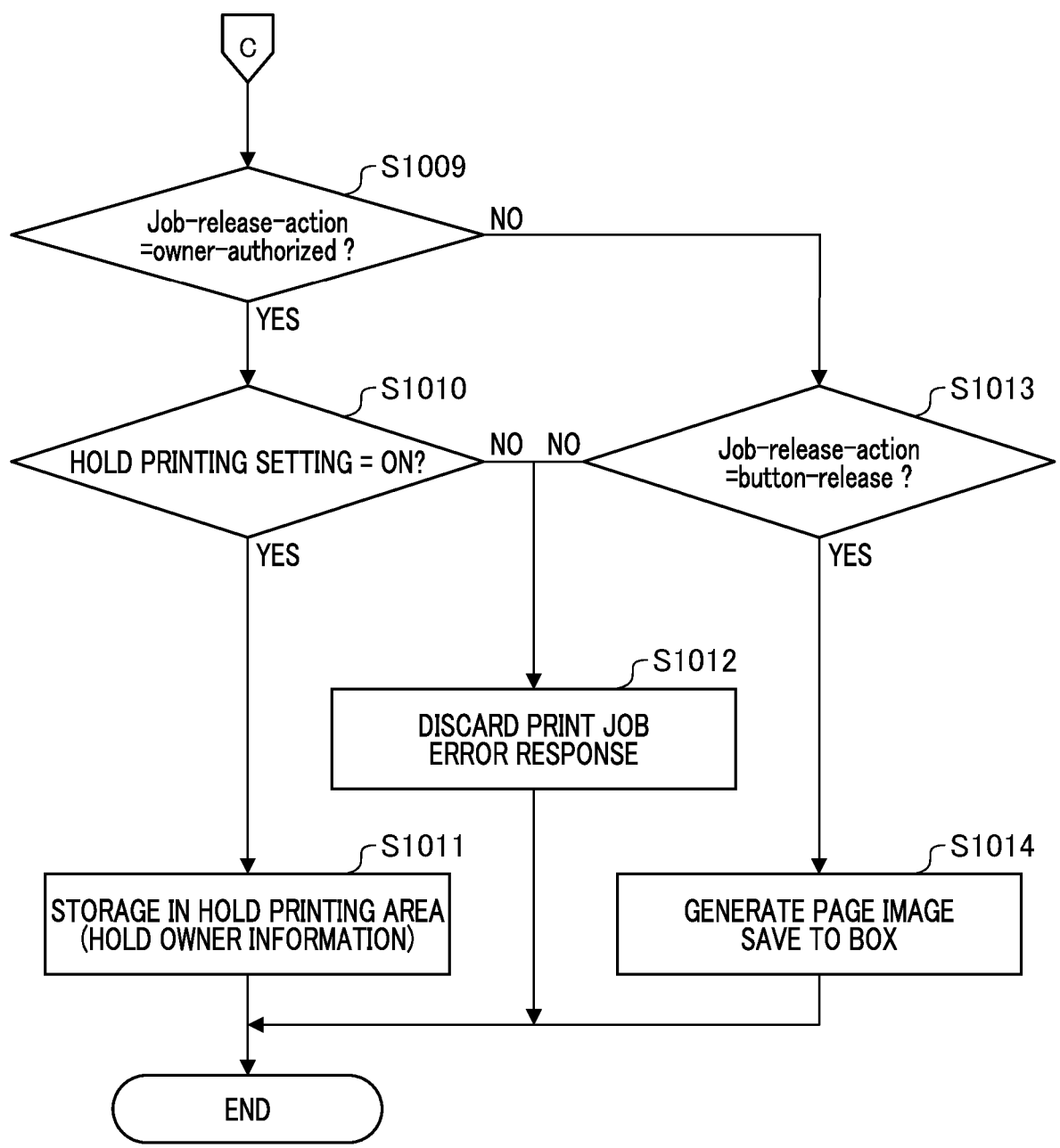
FIG. 12 is a flowchart showing the processing when the printing device 100 shown in FIG. 1 receives a print job.

FIG. 11 and FIG. 12 are flowcharts showing the processes when the printing device 100 receives a print job. Each process shown in the flowchart in FIG. 11 and FIG. 12 is realized by the CPU 201 reading a program stored in the ROM 203 or the HDD 204 and executing the program.

If the received packet includes a print job execution instruction, the IPP request analysis unit 307 of the printing device 100 that has received the print request requests reception control of the print job to the print job control unit 309 (S1001). In S1002, the IPP request analysis unit 307 analyzes the job attributes that are added to the print job and reports the analyzed print attributes as job attributes to the print job control unit 309. In the subsequent processes, the print job is processed by the printing application that is appropriate for the processing method that the job attribute instructed by IPP intends, by analysis of the job attributes performed by the print job control unit 309.

The print job control unit 309 confirms whether or not the job attribute including instructions for storing a print job in the storage area is included. Specifically, the print job control unit 309 confirms whether or not job-release-action is specified as the job attribute (S1003).

When the determination in S1003 is "NO", the print job control unit 309 advances the processing to S1004. In S1004, the print job control unit 309 performs processing as a normal print job regardless of job-storage and ends the processing.

When the determination in S1003 is YES, the print job control unit 309 confirms whether or not the printing device 100 has a storage area for storing the print job (S1005). Note that, in the processes shown in FIG. 5 and FIG. 6, since the job-storage-related attribute is returned as a capability response only when the printing device 100 has a storage area, the determination in S1005 is normally YES.

When it is determined that the storage area is not provided due to factors such as a change in the configuration of the printing device 100 (NO in S1005), the print job control unit 309 discards the print job that was received as error processing and generates an error response by IPP (S1006). Subsequently, the print job control unit 309 ends the processing. When the printing device 100 has a storage area for storing the print job (YES in S1005), the print job control unit 309 advances the processing to S1007.

The print job control unit 309 confirms the value of the job-release-action attribute specified as a job attribute by the processes following S1007, and calls a printing application that is compatible with each value. When the value of job-release-action is job-password (YES in S1007), the secure job control unit 310 is called, the print job is stored as a secure job (S1008), and the process ends. Although, in some cases, such as when an appropriate password is not specified as a job attribute, the processing may be completed without storing the print job as error processing, the detailed description will be omitted because the processing is similar to that of an existing secure job. If the value of job-release-action is not job-password (NO in S1007), the print job control unit 309 advances the processing to S1009.

The print job control unit 309 confirms whether or not hold printing is enabled as the print setting when the value of job-release-action is owner-authorized (YES in S1009) (S1010). When the value of job-release-action is not owner-authorized (NO in S1009), the print job control unit 309 advances the processing to S1013. When the hold printing is enabled (YES in S1010), the print job control unit 309 calls the hold printing control unit 312 and advance the processing to S1011. Note that, in the processes in FIG. 5 and FIG. 6, since the job-storage-related attribute is returned as a capability response only when the hold printing is enabled, the determination in S1010 is normally YES. In S1011, the hold printing control unit 312 stores the print job in the area for storing the hold printing in the HDD 204 and ends the process (S1011). When the determination in S1010 is NO due to, for example, changes in settings, the print job control unit 309 advances the processing to S1012.

When the value of job-release-action is button-release (YES in S1013), the saved job control unit 311 calls the saved job control unit 311 and advances the processing to S1014. The saved job control unit 311 calls the image processing unit 304, analyzes the print job, generates a page image, stores the generated page image in a predetermined box (S1014), and ends the processing. When the value of job-release-action is not button-release (NO in S1013), the saved job control unit 311 advances the processing to S1012. In S1012, the print job control unit 309 discards the print job that has received as error processing, generates an error response in IPP, and ends the processing.

When the print job is stored in the storage area corresponding to the job attribute of the print job as described above, the printing device 100 transmits a print request response as a success response to the client device 101 (S409). The printing device 100 outputs the print job using a desired printing function by receiving a user operation according to the printing method specified as a job attribute from the operation unit 220 (S410).

Note that, in FIG. 11 and FIG. 12, the process (S1010) for confirming the enabling or disabling of the function is performed only for hold printing. However, it is desirable that the enabling or disabling of the function is similarly confirmed 4 for secure jobs and saving to box, and if the function is disabled, error processing similar to S1012 is performed.

According to the above processing, specifying the printing attribute that matches the printing function using the storage provided in the printing device 100 in the printing protocol that is standard, and using the print workflow that the user intends and wants to achieve that has been present in prior art in the standard are made possible.

Second Embodiment

The printing system according to the second embodiment of the present invention will be explained below. In the first embodiment described above, a printing application is determined by using the job-release-action attribute to determine printing capability related to the job-storage attribute. In addition to this, in the second embodiment, a configuration in which the consistency with other attributes predefined in IPP is taken into consideration is adopted.

In the present embodiment, in addition to job-release-action-supported described in the first embodiment, the response result of printing capacity by job-storage-access-supported is also taken into consideration. Thus, the consistency with IPP can be further enhanced.

The job-storage-access attribute is an IPP attribute that specifies access restrictions for print jobs stored in the printing device 100, by which the values of owner/group/public can be obtained. "owner" indicates that access can be performed only by the user who has input the print jobs (job owner). "public" indicates that access can be performed by all users who use the printing device 100. "group" indicates that access can be performed by only users who belong to a group predefined by a job-storage-group attribute.

Taking into consideration the consistency between each definition and the printing application based on the above definition in IPP, when "owner" is specified in job-storage-access, processing as hold printing that requires user authentication is desirable. Additionally, when "public" is specified in job-storage-access, saving to a shared box that arbitrary user can access is appropriate. Additionally, when job-password is specified in job-release-action for secure jobs, the specification of job-storage-access" is optional. However, the present embodiment adopts the configuration in which the specification of "public" to job-storage-access is excluded. In the present invention, it is sufficient to perform mapping of the attribute value that matches the intended use of the printing application using the storage area that is provided in the printing device 100 within the range in which the specification predefined in the IPP standard is not exceeded.

<Example of Capability Response Packet>

FIG. 13A is a diagram showing an example of a capability query request packet using the Get-Printer-Attributes operation of IPP as an example of a packet that queries printing capability in the second embodiment. FIG. 13B is a diagram showing an example of a capability response packet using the Get-Printer-Attributes operation of IPP as an example of that packet that queries printing capability in the second embodiment. In FIG. 13A and FIG. 13B, explanations that are the same as the first embodiment shown in FIG. 7A and FIG. 7C will be omitted.

In the print capability query packet shown in FIG. 13A, in addition to job-release-action-supported 1101, job-storage-access-supported attribute 1102 is also requested. In the printing capability response packet shown in FIG. 13B, an example of supporting owner/public is shown as job-storage-access-supported attribute 1111.

<Capability Response Processing of Printing Device>

Figure 14:
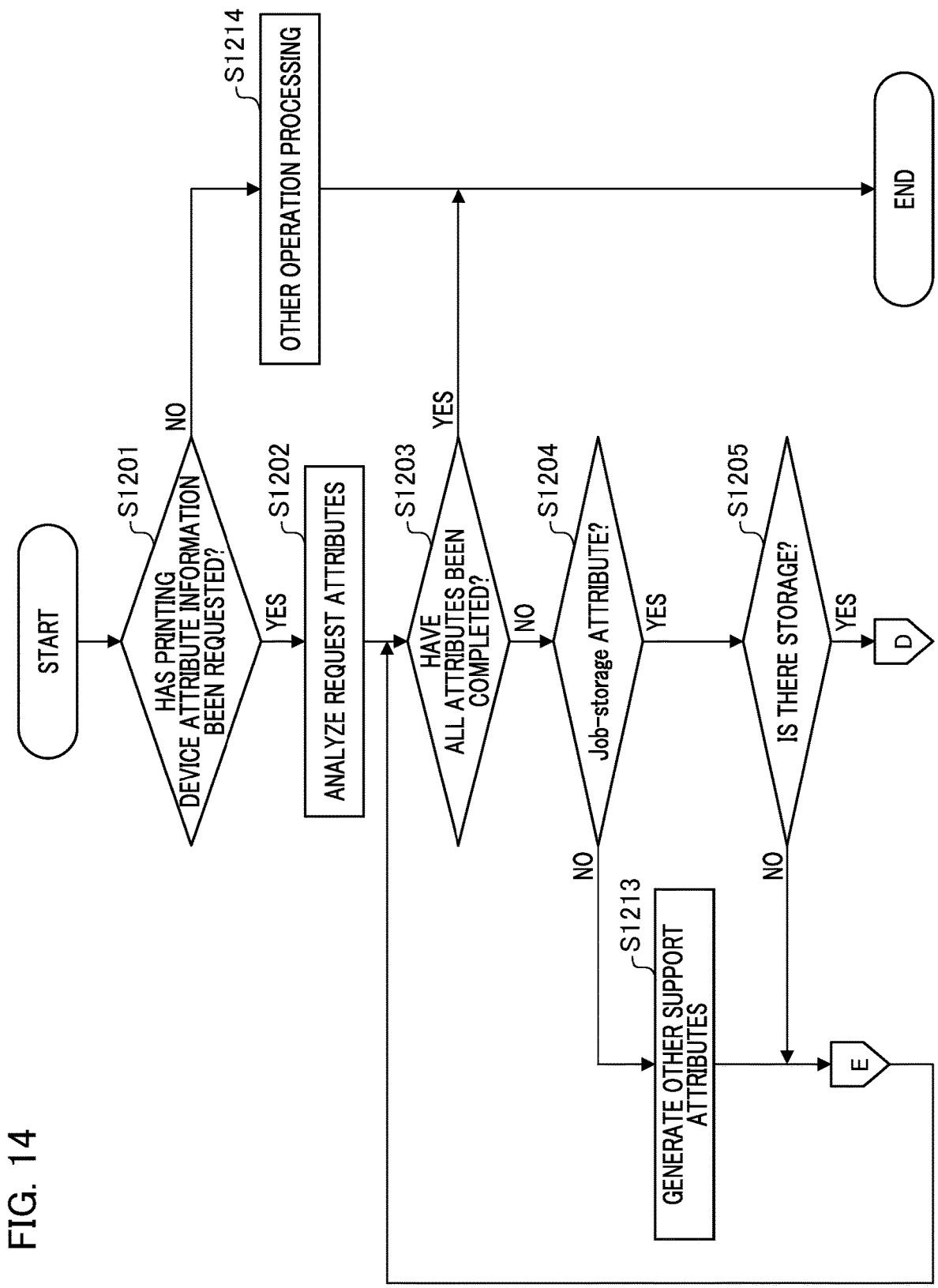
FIG. 14 is a flowchart showing the generation procedure of the printing capability response packet performed by the printing device 100 in the second embodiment.
Figure 15:
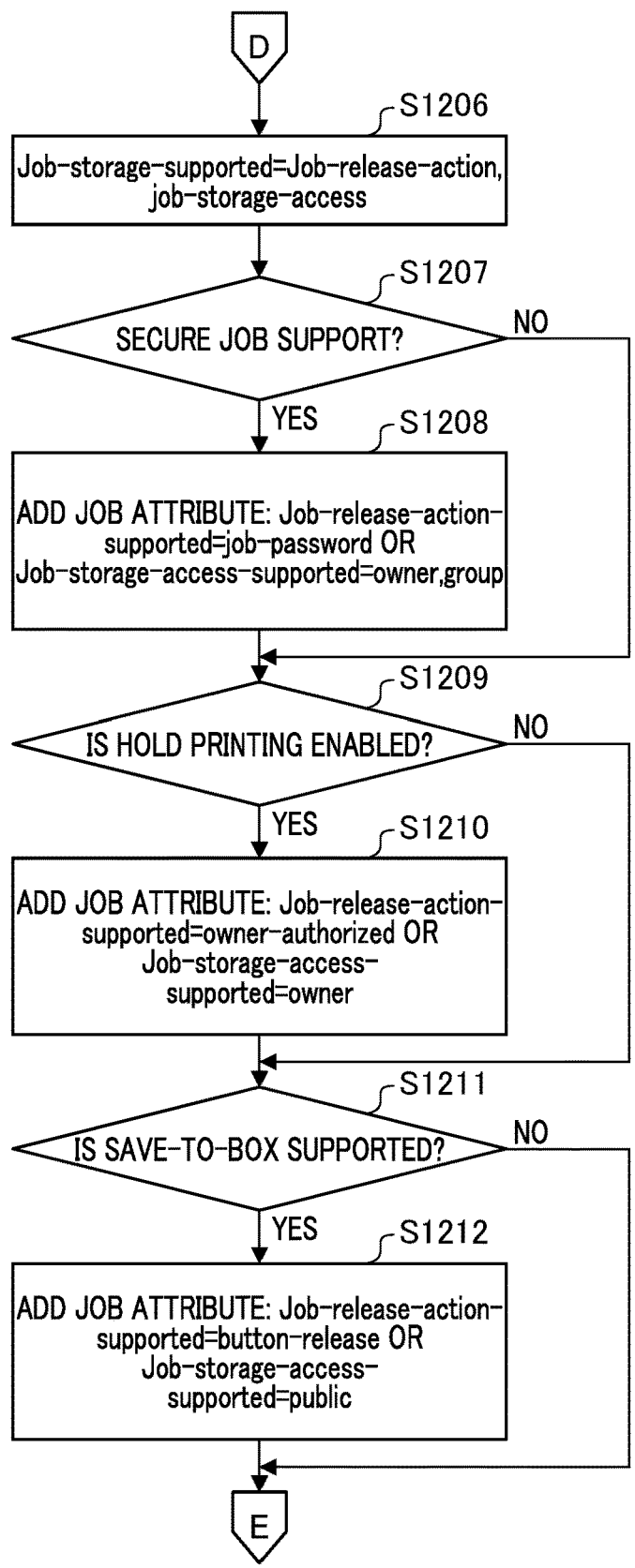
FIG. 15 is a flowchart showing the generation procedure of the printing capability response packet performed by the printing device 100 in the second embodiment.

FIG. 14 and FIG. 15 are flowcharts showing the generation procedure of the printing capability response packet by the printing device 100 in the second embodiment. The flowcharts in FIG. 14 and FIG. 15 are flowcharts showing the procedure in which the IPP request analysis unit 307 and the IPP response control unit 308 of the printing device 100 generate the response packet shown in FIG. 13B. The processes shown in FIG. 14 and FIG. 15 are realized by the CPU 201 reading out a program on which the operation of each configuration in FIG. 3A has been described from the ROM 203 or the HDD 204 and executing the program.

Note that, in the description below, the same processing as in the first embodiment shown in FIG. 5 and FIG. 6 will be omitted in the detailed description of the processing, by referring to the corresponding symbols. Each of the processes of S1201 to S1206, S1213, and S1214 in FIG. 14 and FIG. 15 are the same as each of the processes in S501 to S506, S513, and S514 in FIG. 5 and FIG. 6, and the explanation will therefore be omitted. However, in S1204, the determination is YES even when the job-storage-access-supported attribute is included as a capability request related to job-storage.

Although the IPP response control unit 308 generates a capability response result according to the enabling of each printing application in the processes following S1207 as in the first embodiment, the difference from the first embodiment is that the attributes to be returned are different according to the attributes included in the capability request that has been determined in S1204. That is, when the attribute to be returned as the printing capability is job-storage-access-supported, the IPP response control unit 308 determines whether or not the secure job is enabled (S1207). When the secure job is enabled (YES in S1207), the IPP response control unit 308 adds "owner, group" as values to be returned (S1208).

Additionally, when hold printing is enabled (YES in S1209), the IPP response control unit 308 adds "owner" if "owner" has not been added (S1210). Furthermore, when save to box is enabled (YES in S1211), the IPP response control unit 308 adds "public" (S1212).

Table 1 shows the content of the response packets that the IPP response control unit 308 generates according to the flowcharts shown in FIG. 14 and FIG. 15, for each combination of the operating states of each print application in the print settings of the printing device 100.

TABLE 1

PRINT APPLICATION SETTINGS AND CAPABILITY RESPONSE OF job-storage ATTRIBUTE

| NO. | SAVED JOB | SECURE JOB | HOLD PRINTING | job-release-action-supported | job-storage-access-supported |
|---|---|---|---|---|---|
| 1 | OFF | OFF | OFF | — | — |
| 2 | OFF | OFF | ON | owner-authorized | owner |
| 3 | OFF | ON | OFF | job-password | owner, group |
| 4 | OFF | ON | ON | job-password, owner-authorized | owner, group |
| 5 | ON | OFF | OFF | button-release | public |
| 6 | ON | OFF | ON | button-release, owner-authorized | owner, public |
| 7 | ON | ON | OFF | button-release, job-password | owner, group, public |
| 8 | ON | ON | ON | button-release, job-password, owner-authorized | owner, group, public |

In Table 1, "No. 1" indicates the case in which all print applications using storage are disabled, in this case, the attributes related to job-storage are not included and are reflected in the response result of the print capability as an unsupported one.

In the present embodiment, it is possible to perform the response regarding the printing capability by a plurality of attributes, in which the support status of the printing application using the storage provided in the printing device 100 are appropriately reflected, by the above processing.

<Reception Control of Print Job>

Figure 16:
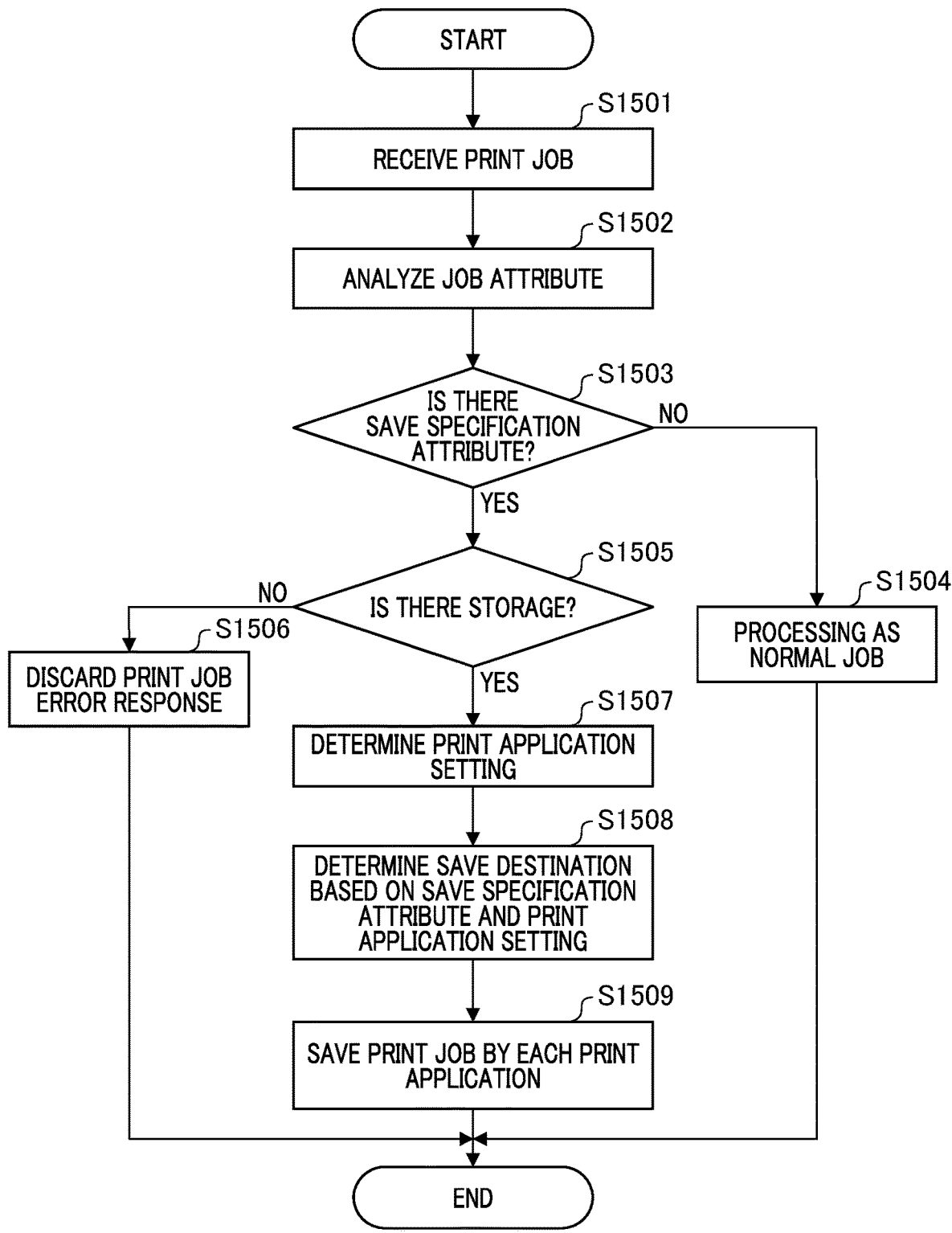
FIG. 16 is a flowchart showing the procedure when the printing device 100 in the second embodiment receives a print job.

A description will be give of which print application is to be used by the printing device 100 to process a print job when the print job including a plurality of job-storage attributes is input, with reference to the flowchart in FIG. 16 and Table 2.

FIG. 16 is a flowchart showing the procedure when the printing device 100 in the second example receives a print job. FIG. 16 shows the overall flow of saving print jobs and sorting the print jobs to a plurality of print applications according to the print attributes by IPP and the configuration of the printing device 100.

The second embodiment is different from the first embodiment in that, in addition to the printing attributes using the storage area in IPP, the printing application is determined by also taking into consideration the operation status of the printing device 100, that is, the printing settings specified by the user or a device manager from the operation unit 220. Such a configuration results in enabling the sorting into functions with consistency without violating the operating mode of the printing device 100, based on the determination of the printing application that is based on the printing attributes by IPP. The process shown in FIG. 16 is realized by the CPU 201 reading out and a program for which the operation of each configuration in FIG. 3A has been described from the ROM 203 or the HDD 204 and executing the program.

Note that, in the explanation below, detailed explanation of the processing will be omitted by applying corresponding reference numerals, for the same processing as in the first embodiment shown in FIG. 11. Since each process of S1501 and S1502 in FIG. 16 is the same as the processes of S1001 and S1002 in FIG. 11, the explanation will be omitted.

In the processes following S1503, the job attributes of the print job that the print job control unit 309 has received are analyzed and the processing method of the print job is determined depending on whether or not the function of the print application using the storage area is enabled or not.

The print job control unit 309 confirms whether or not job attributes including instructions for storing the print job in the storage area are included in the received print job (S1503). In the present embodiment, whether or not job-release-action or job-storage-access is specified as a job attribute is confirmed, and if it is not specified (NO in S1503), the process proceeds to S1504 and processing as a normal print job is performed.

In contrast, when the determination in S1503 is YES, the print job control unit 309 confirms whether or not a storage area for storing the print job is provided, as in S1005 and S1006 in the first embodiment (S1505). When it is determined that a storage area is not provided (NO in S1505), the print job control unit 309 performs error processing as in the first embodiment (S1506).

Next, the print job control unit 309 confirms whether or not each print application is enabled as a configuration of the printing device (S1507). Subsequently, the print job control unit 309 determines a print application that matches the value of the job-storage-related print attribute specified in the job attribute and the operating status of the print application according to the determination conditions shown in Table 2 to be described below (S1508). In the present embodiment, this print application is any one of the secure job control unit 310, the saved job control unit 311, and an the hold printing control unit 312. Finally, the print job control unit 309 calls the print application determined in S1508, saves the print job in a storage area that each printing application manages (S1509), and ends the processing.

In Table 2, the example of the print attributes specified in print jobs and the corresponding print applications are shown for each combination in which the settings of each printing application of saved jobs, secure jobs, and hold printing are enabled (ON) or disabled (OFF), as in Table 1. Note that, since save destination storage is different for each printing application, the printing application is referred to as save destination storage in Table 2. In Table 2, the case in which "none" is described in the print attribute related to job-storage means the case in which the print attribute has not been specified.

In Table 2, No. 2-2 is the same as No. 2-1 in the ON/OFF status of saved jobs, secure jobs, and hold printing. In Table 2, No. 4-2 and No. 4-3 are the same as No. 4-1 in the ON/OFF status of saved jobs, secure jobs, and hold printing. In Table 2, No. 6-2 and No. 6-3 are the same as No. 6-1 in the ON/OFF status of saved jobs, secure jobs, and hold printing. In Table 2, No. 7-2 is the same as No. 7-1 in the ON/OFF status of saved jobs, secure jobs, and hold printing. In Table 2, No. 8-2, No. 8-3, and No. 8-4 are the same as No. 8-1 in the ON/OFF status of saved jobs, secure jobs, and hold printing.

In No. 1 in Table 2 (a configuration in which all printing applications are OFF), "none" is described in both the attribute (A) and the attribute (B). The attribute (A) is job-release-action, and the attribute (B) is "job-storage-access". This case indicates that only print jobs in which neither print attributes of attribute (A) nor attribute (B) is specified are output as normal jobs.

No. 2-1 in Table 2 (only hold printing is ON) indicates that the processing is performed as hold printing when the value of the attribute (A) is owner-authorized and the attribute (B) is not specified. Additionally, No. 2-1 in Table 2 (only hold printing is ON) indicates that the processing is performed as hold printing when the value of the attribute (A) is owner-authorized and the attribute (B) is owner.

Note that, in the present embodiment, if attributes other than the combinations in Table 2 are specified, it is assumed that the print job is canceled as error processing. However, when the saved job is OFF, button-release is not included in the capability response of job-release-action-supported. Thus, a client device that has properly determined the capability response usually does not specify the print attributes of the combination, for example, No. 2-2.

In contrast, the configuration in which the processing is prioritized by a print application, for which access control to print jobs is more limited, can be adopted to emphasize security. Specifically, if "owner" is specified in job-storage-access, the processing is performed by a print application in which only the owner of the input print job can access the print job. In this case, processing as hold printing or secure job is performed in priority over the specification of job-release-action. (No. 2-2, No. 4-2, No. 6-2, No. 8-2).

However, even without the specification by job-release-action, if "public" is specified in job-storage-access, the configuration of saving to box may be adopted as a printing method in which arbitrary user can access. This case applies to, for example, No. 6-3, No. 7-2, and No. 8-4.

TABLE 2

SPECIFYING METHOD OF job-storage ATTRIBUTE AND PRINTING APPLICATION

| NO. | SAVED JOB | SECURE JOB | HOLD-PRINTING | (A) job-release-action | (B) job-storage-access | SAVE DESTINATION STORAGE |
|-----|-----------|------------|---------------|------------------------|------------------------|--------------------------|
| 1 | OFF | OFF | OFF | None | None | Normal printing |
| 2-1 | OFF | OFF | ON | owner-authorized | None, owner | Hold printing |
| 2-2 | | | | None, button-release | owner | Hold printing |
| 3 | OFF | ON | OFF | job-password | None, owner, | Secure job |
| 4-1 | OFF | ON | ON | owner-authorized | None, owner | Hold printing |
| 4-2 | | | | None, button-release | owner | Hold printing |
| 4-3 | | | | job-password | None, owner, | Secure job |
| 5 | ON | OFF | OFF | button-release | None, public | Save to box |
| 6-1 | ON | OFF | ON | owner-authorized | None, owner | Hold printing |
| 6-2 | | | | None, button-release | owner | Hold printing |
| 6-3 | | | | button-release, | None, public | Save to box |
| 7-1 | ON | ON | OFF | job-password | None, owner, | Secure job |
| 7-2 | | | | button-release | None, public | Save to box |
| 8-1 | ON | ON | ON | owner-authorized | None, owner | Hold printing |
| 8-2 | | | | None, button-release | owner | Hold printing |

TABLE 2-continued

SPECIFYING METHOD OF job-storage ATTRIBUTE AND PRINTING APPLICATION

| NO. | SAVED JOB | SECURE JOB | HOLD-PRINTING | (A) job-release-action | (B) job-storage-access | SAVE DESTINATION STORAGE |
|---|---|---|---|---|---|---|
| 8-3 | | | | job-password | None, owner, | Secure job |
| 8-4 | | | | button-release | None, public | Save to box |

Additionally, if job-release-action=owner-authorized is specified, the processing may be performed as hold printing, regardless of job-storage-access. However, in this case, it is possible to hold a print job in which the owner of the print job is unspecified as an indefinite job, and it is desirable that any user can output the print job. In addition, it is desirable that the printing job in which job-storage-access=public has been specified is held as the indefinite job as described above.

According to the present embodiment, even when a plurality of job attributes by IPP are specified by the method described above, it becomes possible to apply a print application using storage that matches the processing method intended by the job attributes.

Third Embodiment

A print system according to the third embodiment of the present invention will be explained below. Although the print screen control unit 321 of the client device 101 shown in the first embodiment controls the display of the print setting screen by using the job attributes defined in the IPP standard without any changes, the user does not always know the specification of IPP, and as a result, the display is not helpful.

Accordingly, in the present embodiment, a method for customizing the content of display of the print setting screen using a message catalog of IPP is proposed so that the convenience and ease are further enhanced during the use of the print application that uses the storage area of the printing device 100 by IPP. The message catalog is a mechanism for performing localized display for text attribute values of IPP on the client device side, and is a file in which mapping between attribute values and content of display is defined for each language supported by the printing device 100. The client device 101 acquires the catalog file for each language from the printing device 100, and displays replacing the contents of the print setting screen and the like according to the mapping described in the catalog file.

Figure 17A:
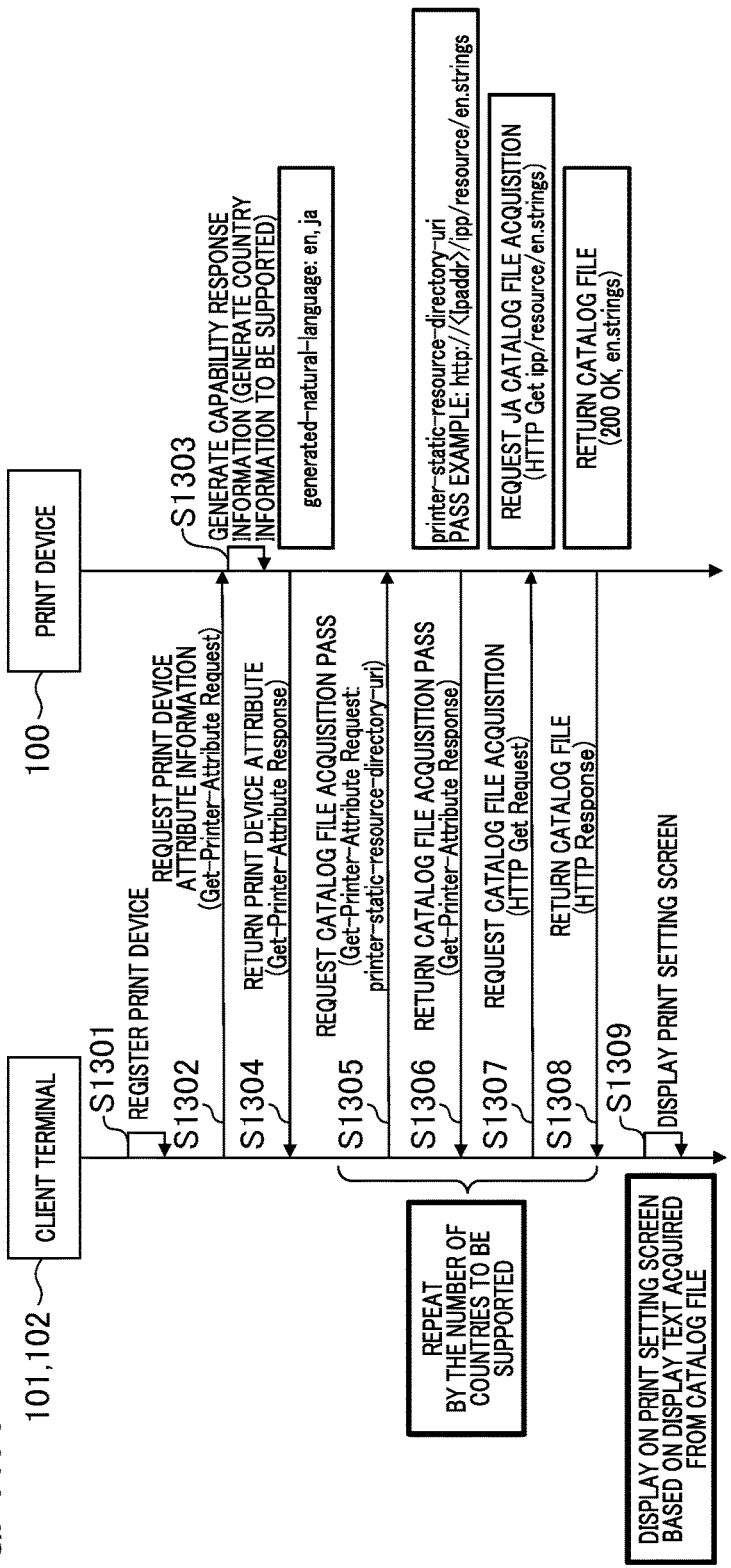
FIG. 17A is a diagram showing the display sequence of the print setting screen in the third embodiment.

FIG. 17A is a diagram showing the display sequence of the print setting screen in the third embodiment. Note that since the processes until printing device registration (S1301) can be similar to the processes from S401 to S403 in FIG. 4 in the first embodiment, the explanation will be omitted.

First, the IPP request control unit 324 of the client device 101 in the present embodiment also requests the printing device 100 for a list of natural languages that is supported by the printing device 100 during query of print capability (S1302). Specifically, it queries the support status of the generated-natural-language attribute, and the printing device 100 generates the list of natural languages that the printing device 100 itself supports (S1303) in response to the query of printing capability (S1304) and returns the list. The printing device 100 shown in the present embodiment performs a response that supports English ("en") and Japanese ("ja").

Next, the client device 101 repeats the processes from S1305 to S1308 only by the number of languages included in the list of natural languages, and acquires the message catalog for each language. In the present embodiment, first, the client device 101 requests RUI information indicating the location of the message catalog related to English (S1305). RUI is an abbreviation for "Remote User Interface". The RUI information indicating the location of the message catalog is an acquisition path of message catalog (printing static-resource-directory-uri attribute).

Next, the printing device 100 returns the RUI information of the message catalog related do English (S1306). A specific example is, for example, "http://<IP address of the printing device>/IPP/Resource/En.Strings", and the like are displayed.

Next, the client device 101 performs an acquisition request of the catalog file of the message catalog that is indicated by the RUI information acquired in S1306 by using the HTTP GET method (S1307). The printing device 100 transmits an English catalog file as a response, and the client device 101 receives this catalog file (S1308). The transmission of the catalog file by the printing device 100 in S1308 is an example of a catalog file response means that returns the catalog file in response to the request from the client device 101.

Finally, the print screen control unit 321 of the client device 101 determines the text content to be displayed on the print setting screen by referring to the content of the catalog file that has received in S1308, and displays the print setting screen (S1309).

Figure 17B:
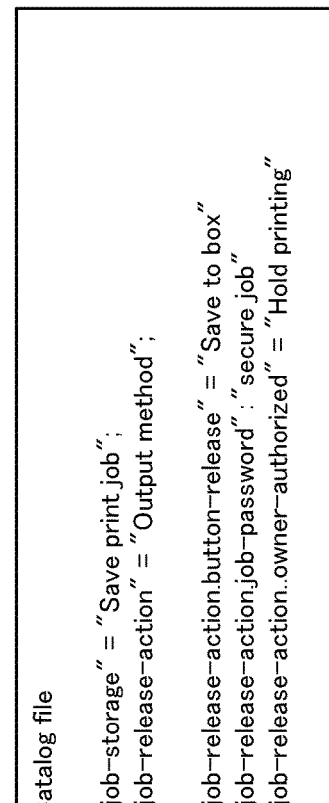
FIG. 17B is a diagram showing an example of a message catalog in the third embodiment.

FIG. 17B is a diagram showing an example of the catalog file that client device 101 has received according to the sequence shown in FIG. 17A, and a diagram showing an example of the catalog file in the case of Japanese ("ja"). In the catalog file, texts to be displayed in each language are described in pairs after "=" following the IPP attribute name. That is, in the catalogue file, the name in the printing device 100 corresponding to the attribute name in the IPP of the attribute information is mapped.

Figure 18:
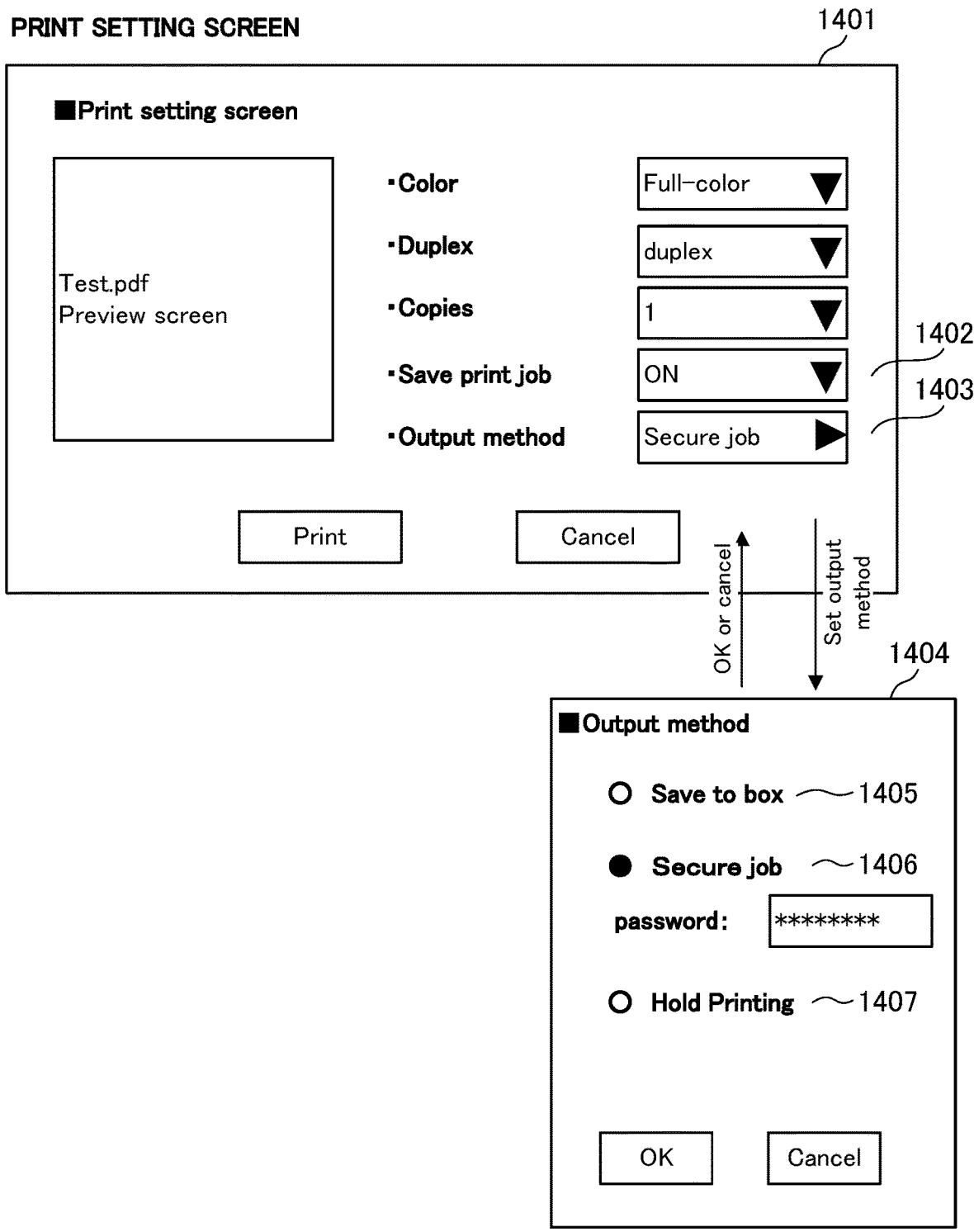
FIG. 18 is a diagram showing an example of the print setting screen in the third embodiment.

In the present embodiment, in addition to the simple localization, the function name of the printing application that is supported by the printing device 100 is mapped to correspond to the attribute that is related to the control of the printing job using the storage area. Specifically, "job-storage" is converted to "save a print job" as an example, as shown in line 1311 in FIG. 17B. Similarly below, mapping related to job-storage-related attributes is defined, as shown in lines from 1312 to 1315 in FIG. 17B, FIG. 18 is a diagram showing an example of a print setting screen in the third embodiment. In FIG. 18, since the descriptions that are not directly related to the present embodiment are the same as those in FIG. 9 in the first embodiment, the explanation will be omitted. As shown in FIG. 18, the print screen control unit 321 converts the IPP attribute name into the name that is mapped in the catalog file and displays the name on a print setting screen 1401.

In the printing setting screen 1401 in the present embodiment, the content of the display related to the printing method in which the storage area of the printing device 100 is used is displayed in association with the printing application of the printing device 100 based on the mapping of the catalog file. In the print setting screen 1401, for example, "save a print job" is displayed in a display column 1402 in which "job-storage" is displayed in FIG. 9. In the printing setting screen 1401, for example, "output method" is displayed in a display column 1403 in which "job-release-action" is displayed in FIG. 9.

Regarding the details of "output method", "Button-release is save to box" is displayed on the print setting screen 1401 based on the correspondence in line 1313. Regarding the details of "output method", "job-password is secure job" is displayed on the printing setting screen 1401 based on the correspondence in line 1314. Regarding the details of "output method", "owner-authorized is hold printing" is displayed on the printing setting screen 1401, based on the correspondence in line 1315.

Additionally, in a pop-up screen 1404, the details of "output method" are displayed based on the mapping of the catalog file. That is, regarding "Button-release", in the popup screen 1404, "save to box" is displayed in a display column 1405 based on the correspondence in line 1313. Regarding "job-password", in the popup screen 1404, "secure job" is displayed in a display column 1406 based on the correspondence in line 1314. Regarding "owner-authorized", in the popup screen 1404, "hold printing" is displayed in a display column 1407 based on the correspondence in line 1315.

According to the present embodiment, IPP language support (message catalog) is used as described above. Thus, it is possible to replace the display items on the print setting screen with contents that match the print purpose and the user intention, and provide an easy-to-understand usability that is equivalent to a vendor-supplied printer driver.

Fourth Embodiment

A printing system according to the fourth embodiment in the present invention will be explained below. The method using the message catalog shown in the third embodiment requires that the OS on the client device 101 side corresponds to the mechanism of IPP message catalog. Additionally, there are cases in which some client devices 101 are not applicable, including the case in which an IPP standard driver needs to be used.

Thus, in the fourth embodiment, a configuration is adopted in which the display on the operation unit 220 is performed in such a manner that when the user displays the operation unit 220 of the printing device 100, the user can recognize whether or not the print job to be output is saved by the printing application that uses the storage area. For example, if a saved job that has been input by IPP and has not been output is present, the number of corresponding print jobs may be displayed on the status line and the like of the operation unit 220. Alternatively, if the user information specified in the secure job matches the logged-in user information when the user logs in to the printing device, the presence of the secure job may be reported to the status line and the like of the operation unit.

However, regarding hold printing, there is no need to pay special consideration because a function of displaying a print job owned by the user is provided in the operation part 220 upon log-in by the user to the printing device 100.

According to the present example, by adopting the above configuration, easy guidance to the output operation using the printing application that uses the storage area of the printing device 100 is possible even in printing from the client device 101 in which the IPP standard driver has to be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-012398, filed Jan. 28, 2022, which is hereby incorporated by reference wherein in its entirety.

What is claimed is:

1. A printing system comprising a printing device and a client device that performs an output instruction for a print job to the printing device by a standard protocol,
the printing device comprising:
a storage having a storage region in which a print job can be stored as a saved job;
a first memory storing first instructions; and
a first processor executing the first instructions causing the printing device to:
perform a response regarding attribute information indicating that storage of the saved job is possible and accompanying support attribute information by using the standard protocol, in response to a capability information request from the client device, and
the client device comprising:
a second memory storing second instructions; and
a second processor executing the second instructions causing the client device to:

add the attribute information corresponding to an instruction from a user as an attribute of the print job upon receipt of a capability response indicating that the storage of the saved job is possible from the printing device, wherein the instruction from the user as the attribute of the print job includes:
an attribute indicating actions when the user executes the print job; and
an attribute for one who has access privilege of the print job, and wherein the printer device:
depending on a combination of a value of the attribute indicating actions when the user executes the print job, and a value of attribute for one who has the access privilege of the print job, changes a kind of save destination storages; and
prints in accordance with the kind of save destination storages.

2. The printing system according to claim 1,
wherein the second processor further executes the second instructions causing the client device to display a print setting screen according to the attribute information that the printing device supports obtained by the response from the printing device.

3. The printing system according to claim 2,
wherein the first processor further executes the first instructions causing the printing device to perform a response regarding a catalog file in which mapping of a name in the printing device to an attribute name in the standard protocol of the attribute information has been performed in response to a request from the client device,
wherein the second processor further executes the second instructions to display a name in the printing device on the print setting screen based on the catalog file obtained by the response from the printing device.

4. The printing system according to claim 1,
wherein the first processor further executes the first instructions causing the printing device to:
authenticate a user; and
perform display such that a job associated to the authenticated user from among the saved jobs can be selected by the user.

5. The printing system according to claim 1,
wherein the first processor further executes the first instructions causing the printing device to execute a matched application according to the combination of the attributes of the print job from the client device.

6. The printing system according to claim 1,
wherein the value of the attribute indicating actions when the user executes the print job includes:
a value as to whether or not secure jobs that require a password are supported for the printer device;
a value as to whether or not saved jobs are supported for the printer device; or
a value as to whether or not saving by the printer device is supported to the storage area to permit being able to change printing attributes or transmit data therein to an external device, and
wherein the value of the attribute for one who has the access privilege of the print job includes:
"owner", which indicates that access can be performed only by the user who has input the print job;
"group", which indicates that access can be performed by only users who belong to a predefined group; or
"public", which indicates that access can be performed by all users who use the printing device.

7. The printing system according to claim 1,
wherein the kind of save destination storages includes at least one of "normal printing", "hold printing", "secure job", or "save to box",
wherein, when the kind of save destination storages is "hold printing", the printing device holds a print job to which user information has been added,
wherein, when the kind of save destination storages is "secure job", the printing device realizes a secure job that requires a password input, and
wherein, when the kind of save destination storages is "save to box", the printing device saves data to the storage area to permit being able to change printing attributes or transmit data therein to an external device.

8. A non-transitory storage medium storing a control program of a printing device of a printing system comprising the printing device having a storage region in which a print job can be stored as a saved job and a client device that performs an output instruction of a print job to the printing device by a standard protocol, the control program causing a computer to perform each step of a control method of the printing device, the method comprising:
performing a response regarding attribute information indicating that storage of the saved job is possible and accompanying support attribute information by using the standard protocol, in response to a capability information request from the client device; and
receiving a print job in which the attribute information corresponding to an instruction from a user is added as an attribute of a print job,
wherein the instruction from the user as the attribute of the print job includes:
an attribute indicating actions when the user executes the print job; and
an attribute for one who has the access privilege of the print job, and
wherein the control method further includes:
depending on a combination of a value of the attribute indicating actions when the user executes the print job, and a value of attribute for one who has the access privilege of the print job, changing a kind of save destination storages; and
printing in accordance with the kind of save destination storages.

9. The storage medium according to claim 8,
wherein the method further comprises performing a response regarding a catalog file in which mapping of a name in the printing device to the attribute name in the standard protocol of the attribute information has been performed, in response to a request from the client device.

10. The storage medium according to claim 8, wherein the method further comprises:
authenticating a user; and
performing display such that a job associated to the authenticated user from among the saved jobs can be selected by the user.

11. The storage medium according to claim 8,
wherein the method further comprises executing a matched application according to the combination of attributes of the print jobs from the client device.

12. A non-transitory storage medium storing a control program of a client device of a printing system comprising a printing device that has a storage region in which a print job can be stored as a saved job and the client device that performs an output instruction for a print job to the printing device by a standard protocol, the control program causing a computer to perform each step of a control method of the client device, the method comprising:

receiving capability information showing that the storage of the saved job is possible depending on the capacity information request from the client device and accompanying support attribute information by using the standard protocol from the printing device as a response to a capability information request from the client device, and adding attribute information corresponding to an instruction from a user as an attribute of the print job if a capability response indicating that the storage of the saved job is possible is received from the printing device, wherein the instruction from the user as the attribute of the print job includes:

an attribute indicating actions when the user executes the print job; and an attribute for one who has the access privilege of the print job, and wherein the printer device:

depending on a combination of a value of the attribute indicating actions when the user executes the print job, and a value of attribute for one who has the access privilege of the print job, changes a kind of save destination storages; and prints in accordance with the kind of save destination storages.

13. The storage medium according to claim 12, wherein the method further comprises displaying a print setting screen according to attribute information that the printing device supports, which has been obtained by a response from the printing device.

14. The storage medium according to claim 12, wherein the method further comprises:

receiving a catalog file in which mapping of a name in the printing device to an attribute name in the standard protocol of the attribute information has been performed; and displaying the name in the printing device on the print setting screen based on the catalog file.

* * * * *